United States Patent
Kohashi et al.

(10) Patent No.: US 7,474,343 B2
(45) Date of Patent: Jan. 6, 2009

(54) IMAGE PROCESSING APPARATUS HAVING A DIGITAL IMAGE PROCESSING SECTION INCLUDING ENHANCEMENT OF EDGES IN AN IMAGE

(75) Inventors: Atsushi Kohashi, Hachioji (JP); Junzo Sakurai, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 3 days.

(21) Appl. No.: 11/647,132

(22) Filed: Dec. 29, 2006

(65) Prior Publication Data

US 2007/0109424 A1    May 17, 2007

Related U.S. Application Data

(62) Division of application No. 10/947,250, filed on Sep. 23, 2004.

(51) Int. Cl.
*H04N 9/68* (2006.01)
*H04N 5/21* (2006.01)
*H04N 9/77* (2006.01)

(52) U.S. Cl. .................. 348/234; 348/235; 348/625; 348/712

(58) Field of Classification Search .............. 348/234, 348/235, 252, 266, 289, 631, 627, 663, 612, 348/675, 703, 712
See application file for complete search history.

(56) References Cited

U.S. PATENT DOCUMENTS

| 5,212,740 | A | * | 5/1993 | Paek et al. ............... 382/266 |
| 5,381,490 | A | * | 1/1995 | Shin ........................ 382/266 |
| 5,768,403 | A | | 6/1998 | Suzuki et al. |
| 5,953,058 | A | | 9/1999 | Hanagata |
| 6,028,646 | A | | 2/2000 | Jeong et al. |
| 6,192,162 | B1 | * | 2/2001 | Hamilton et al. ........... 382/266 |
| 6,400,403 | B1 | | 6/2002 | Saito |
| 6,456,325 | B1 | | 9/2002 | Hayashi |
| 6,642,962 | B1 | * | 11/2003 | Lin et al. .................. 348/252 |
| 6,774,943 | B1 | * | 8/2004 | Kao et al. ................. 348/252 |
| 2001/0009438 | A1 | | 7/2001 | Kihara et al. |

FOREIGN PATENT DOCUMENTS

JP   9-261513 A   10/1997
JP   10-108208 A   4/1998

* cited by examiner

*Primary Examiner*—Luong T Nguyen
(74) *Attorney, Agent, or Firm*—Westerman, Hattori, Daniels & Adrian, LLP.

(57) ABSTRACT

An image processing apparatus includes: an image pickup section for converting an object light into image signals of Bayer RGB array; a color information detecting section for obtaining color information of the object from the image signals obtained by the image pickup section; a first luminance data generating section for finding luminance data for use in edge enhancement processing based on G signals of the image signals obtained by the image pickup section; a second luminance data generating section for finding luminance data for use in edge enhancement processing based on all color signals of the image signals; a selector for providing an output by switching between outputs of the first and second luminance data generating section; and a selection signal generating section for generating selection signal for controlling the switching of the selector based on color information obtained at the color information detecting section. The image processing apparatus is thereby achieved as capable of edge enhancement processing at favorable S/N and with less occurrence of edge noise in high saturation regions and low saturation regions.

9 Claims, 19 Drawing Sheets

IMAGE PROCESSING APPARATUS HAVING A DIGITAL IMAGE PROCESSING SECTION INCLUDING ENHANCEMENT OF EDGES IN AN IMAGE

This application is a divisional of application Ser. No. 10/947,250, filed Sep. 30, 2004 which is a division of application Ser. No. 09/695,420, filed Oct. 25, 2000, now U.S. Pat. No. 6,816,193.

BACKGROUND OF THE INVENTION

The present invention relates to image processing apparatus, and more particularly to an image processing apparatus having a digital image processing section including enhancement of edges in image to be displayed. When an image is processed for edge enhancement, a technique is generally used to extract edge components within the image so as to add the extracted edge components to the original image. In such case, the edge components to be added are obtained by extracting high-frequency components of luminance signals of the image. In image pickup devices using RGB primary-color filter, the techniques for generating luminance signal to extract such high-frequency components include: (1) technique for generating luminance signal by using only G (green) signals out of all the color signals of RGB within the image; and (2) technique for generating luminance signal by using all the color signals of RGB in the image.

An example of construction of conventional image processing apparatus will now be explained by way of FIG. 1 in which such two techniques are used to generate luminance signal to perform edge enhancement processing. Referring to FIG. 1, numeral 101 denotes an image pickup means; image signals of Bayer RGB array are obtained from the image pickup means 101. The Bayer RGB array image signals are subjected to white balancing at a white balancing section 102. Luminance data are then generated from 2G or (R+2G+B)/2 at a luminance data generating section 103 where R, G, B represent the outputs of the color signals of R (red), G (green), B (blue), respectively. The luminance data are then passed through a high-pass filter 104 to extract edge components and the degree of edge enhancement is adjusted at an edge enhancement adjusting section 105 to form edge signals.

On the other hand, image signals after the white balancing are separated of colors by pixel as a unit into RGB signals at color separation circuit 106 and then subjected to color correction and γ correction at a color correction/γ correction circuit 107. The RGB signals are converted into Y, Cr, Cb signals at YC conversion section 108. The above described edge signals are then added to the luminance signal Y outputted from YC conversion section 108 at an adder circuit 109 to obtain edge-enhanced luminance signal Y.

The above two techniques have their respective merits and demerits. In particular, FIG. 2A shows a part of image consisting of pixels of Bayer RGB array. In such image of Bayer RGB array, two times of image signals S are used in the case of generating luminance signal Y from 4 pixels of RGB (R+2G+B) as shown in FIG. 2B as compared to the case of generating luminance signal Y as shown in FIG. 2C from two pixels of G. The resulting noise N, on the other hand, is only $2^{1/2}$ times from the theory of noise reducer. For this reason, supposing S/N at the time of generating from two pixels of G as 1/1=1, that at the time of generating from 4 pixels of RGB becomes $2/2^{1/2}=2^{1/2}$. The case of generating from 4 pixels of RGB becomes $2^{1/2}$ times better. Since, however, the signals of R, B, which contain not much genuine luminance information, are used as luminance signal when 4 pixels of RGB are used, excessively emphasized edges are generated and defects occur especially at the portion of boundary between two highly saturated colors.

As has been described, there are merits and demerits in both the case of using only G signal and the case of using all the color signals of RGB in generating luminance signal. These are summarized in Table 1.

TABLE 1

| Luminance signal generation method | S/N | Edge noise of high saturation portion | Edge noise of low saturation portion |
|---|---|---|---|
| From only G | Bad | Small | Large |
| From RGB | Good | Large | Small |

Prior-art techniques according to some specific documents will now be described. Japanese patent application laid open Hei-10-108208 for example discloses a technique in which contour signals (edge components) are extracted from G signals to perform edge enhancement. Further, Japanese patent laid open application Hei-9-261513 discloses a contour (edge) enhancing method in which two types of contour extracting methods, i.e., MIX (mix) mode and NAM (non-average mix) mode are switched to each other according to the saturation of image. Here, MIX mode refers to generation of contour enhancement signal after addition of a plurality of signals corresponding to the three primary colors of RGB, etc., in the light of image to be displayed; NAM mode refers to generation of contour enhancement signal by adding one selecting the signal emphasized most in the direction of black and one selecting the signal emphasized most in the direction of white out of the respective contour enhancement signals of the above described plurality of signals.

Thus the problem is that there are respective merits and demerits as described above of the technique for generating luminance signal by using only G signals in the image to extract edge components and the technique for generating luminance signal by using all the color signals of RGB in the image to extract edge components. Further, the contour enhancement technique as disclosed in the above Japanese patent laid open application Hei-9-261513 has a problem that, if Bayer RGB array is used as the color filter array of image pickup device, the mere switching between the two types of contour extracting methods according to saturation alone may, depending on the colors of image, fall short of suitable processing due to lack of information. Furthermore, there is a problem of complicated construction in the NAM mode, since it is necessary to perform addition by respectively selecting one emphasized most in the direction of black and one emphasized most in the direction white out of the contour enhancement signals.

SUMMARY OF THE INVENTION

To eliminate the above problems in the conventional methods of edge enhancement processing of an image, it is an object of the present invention to provide an image processing apparatus having a digital image processing section including edge enhancement processing of simple construction having only the respective merits of the prior-art techniques.

In accordance with a first aspect of the invention, there is provided an image processing apparatus having a processing section for enhancing edges in an image, including: image pickup means for converting an object light into image signals of Bayer RGB array; color information detection means for obtaining color information of the object from the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; and luminance data switch means for providing an output by switching between outputs of the first and second luminance data generation means based on the color information obtained at the color information detection means.

By such construction, an output is provided on the basis of color information obtained at the color information detection means by switching between output of the first luminance data generation means for finding luminance data from G signal and output of the second luminance data generation means for finding luminance data from all color signals of the image signals. Hence edge enhancing components can be extracted on the basis of an optimal luminance data corresponding to the color information, an edge enhancement processing is possible with a favorable S/N and with less edge noise in high saturation regions and low saturation regions. The above object is thereby achieved.

It is another object of the invention to provide an image processing apparatus in which switching of the techniques for generating luminance data for use in edge enhancement processing is smooth and the edge enhancement processing is performed without unnaturalness.

In accordance with a second aspect of the invention, there is provided an image processing apparatus having a processing section for enhancing edges in an image, including: image pickup means for converting an object light into image signals of Bayer RGB array; color information detection means for detecting color information of the object from the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); and means for setting the mixing ratio at the mixed luminance data generation means based on the color information obtained at the color information detection means.

By such construction, mixed luminance data is generated on the basis of color information by mixing the luminance data generated from G signal and the luminance data generated from all color signals with continuously changing the mixing ratio. Hence an optimal luminance data corresponding to the color information can be smoothly changed, making it possible to perform edge enhancement processing without unnaturalness. The above object is thereby achieved.

It is yet another object of the invention to provide an image processing apparatus in which an image processed of edge enhancement at favorable S/N can be obtained even for an image having frequent edge portions.

In accordance with a third aspect of the invention, there is provided an image processing apparatus having a processing section for enhancing edges in an image, including: image pickup means for converting an object light into image signals of Bayer RGB array; edge information detection means for detecting edge information of the object from the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; and luminance data switch means for providing an output by switching between outputs of the first and second luminance data generation means based on the edge information obtained at the edge information detection means.

By such construction, an output is provided by switching between the luminance data generated from G signal and the luminance data generated from all color signals on the basis of edge information obtained at the edge information detection means. Hence it becomes possible to perform edge enhancement processing on the basis of an optimal luminance data corresponding to the edge information even in an image having frequent edge portions.

The above object is thereby achieved.

It is a further object of the invention to provide an image pickup apparatus in which, even for an image having frequent edge portions, the techniques for generating luminance data for use in edge enhancement are smoothly switched so that edge enhancement processing without unnaturalness can be performed.

In accordance with a fourth aspect of the invention, there is provided an image processing apparatus having a processing section for enhancing edges in an image, including: image pickup means for converting an object light into image signals of Bayer RGB array; edge information detection means for detecting edge information of the object from the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); and means for setting the mixing ratio at the mixed luminance data generation means based on the edge information obtained at the edge information detection means.

By such construction, mixed luminance data is generated on the basis of edge information by mixing the luminance data generated from G signal and the luminance data generated from all color signals with continuously changing the mixing ratio. Hence an optimal luminance data corresponding to the edge information can be smoothly changed so that edge enhancement processing without unnaturalness can be performed even in an image having frequent edge portions. The above object is thereby achieved.

It is a further object of the invention to provide an image processing apparatus in which an image as processed of edge enhancement at favorable S/N can be obtained corresponding to the characteristic of an object.

In accordance with a fifth aspect of the invention, there is provided an image processing apparatus having a processing section for enhancing edges in an image, including: image pickup means for converting an object light into image signals of Bayer RGB array; color information detection means for detecting color information of the object from the image signals obtained by the image pickup means; edge information detection means for detecting edge information of the object from the image signals obtained by the image pickup means; image region determination means for determining the state of being frequent/infrequent of edge portions (frequency of occurrence per unit area of those regarded as edges, i.e., degree of denseness/sparseness of edges) in the object from the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; luminance data switch means for providing an output by switching between outputs of the first and second luminance data generation means; a first selection signal generating section for generating a selection signal for controlling the switching at the luminance data switch means based on color information obtained at the color information detection means; a second selection signal generating section for generating a selection signal for controlling the switching at the luminance data switch means based on edge information obtained at the edge information detection means; and a selection signal switching section for providing an output by switching between the selection signals of the first selection signal generating section and the second selection signal generating section based on a determination signal from the image region determination means.

By such construction, an output is provided by switching between the selection signal for controlling the switching of the luminance data switch means based on color information and the selection signal for controlling the switching of the luminance data switch means based on edge information on the basis of the determination signal from the image region determination means for determining the state of being frequent/infrequent of the edge portions in an object. Hence the edge enhancement processing at favorable S/N can be performed corresponding to the characteristic of the object. The above object is thereby achieved.

It is a further object of the invention to provide an image processing apparatus in which, corresponding to the characteristic of an object, an image is obtained as processed of edge enhancement processing without unnaturalness where S/N is favorable and the techniques for generating luminance data for use in the edge enhancement processing are switched smoothly.

In accordance with a sixth aspect of the invention, there is provided an image processing apparatus having a processing section for enhancing edges in an image, including: image pickup means for converting an object light into image signals of Bayer RGB array; color information detection means for detecting color information of the object from the image signals obtained by the image pickup means; edge information detection means for detecting edge information of the object from the image signals obtained by the image pickup means; image region determination means for determining the state of being frequent/infrequent of edge portions in the object from the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); a first mixing ratio setting means for setting the mixing ratio at the mixed luminance data generation means based on the color information obtained at the color information detection means; a second mixing ratio setting means for setting the mixing ratio at the mixed luminance data generation means based on the edge information obtained at the edge information detection means; and a mixing ratio setting signal switching section for providing an output by switching between setting signals of the first mixing ratio setting means and the second mixing ratio setting means based on a determination signal from the image region determination means.

By such construction, an output is provided, on the basis of the determination signal from the image region determination means for determining the state of being frequent/infrequent of edge portions of the object, by switching between the setting signal of the first mixing ratio setting means for setting the mixing ratio at the mixed luminance data generation means based on the color information and the setting signal of the second mixing ratio setting means for setting the mixing ratio at the mixed luminance data generation means based on the edge information. Hence edge enhancement processing without unnaturalness can be performed at favorable S/N and smoothly corresponding the characteristic of the object. The above object is thereby achieved.

It is a further object of the invention to provide an image processing apparatus in which, when joining a plurality of images, edge enhancement processing can be performed without causing unnaturalness at the joint portions.

In accordance with a seventh aspect of the invention, there is provided an image processing apparatus having a joining processing section for joining a plurality of images to generate one piece of image and a processing section for enhancing edges in an image, including: image pickup means for converting an object light into image signals of Bayer RGB array; color information detection means for obtaining color information of the object from the image signals obtained by the image pickup means; joint determination means for detecting joint information of the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; and luminance data switch means for providing an output by switching between outputs of the first and second luminance data generation means based on the color information obtained at the color information detection means and the joint information obtained from the joint determination means.

By such construction, on the basis of the color information and joint information, an output is provided by switching between the output of the first luminance data generation means for finding luminance data from G signals and the output of the second luminance data generation means for finding luminance data from all color signals. Hence, in joining a plurality of images, edge enhancement processing can be performed without unnaturalness at the joint portions. The above object is thereby achieved.

It is a further object of the invention to provide an image processing apparatus in which, when joining a plurality of images, edge enhancement processing can be performed smoothly and without unnaturalness at the joint portions.

In accordance with an eighth aspect of the invention, there is provided an image processing apparatus having a joining processing section for joining a plurality of images to generate one piece of image and a processing section for enhancing edges in an image, including: image pickup means for converting an object light into image signals of Bayer RGB array; color information detection means for obtaining color information of the object from the image signals obtained by the image pickup means; joint determination means for detecting joint information of the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); and means for setting the mixing ratio at the mixed luminance data generation means based on the color information obtained at the color information detection means and the joint information obtained from the joint determination means.

By such construction, on the basis of the color information and joint information, mixed luminance data is generated by mixing the luminance data generated from G signal and the luminance data generated from all color signals with continuously changing the mixing ratio. Hence, in joining a plurality of images, edge enhancement processing can be performed smoothly and without unnaturalness at the joint portions. The above object is thereby achieved.

It is a further object of the invention to provide an image processing apparatus in which, when joining a plurality of images, edge enhancement processing without causing unnaturalness at the joint portions can be performed even for an image having frequent edge portions.

In accordance with a ninth aspect of the invention, there is provided an image processing apparatus having a joining processing section for joining a plurality of images to generate one piece of image and a processing section for enhancing edges in an image, including: image pickup means for converting an object light into image signals of Bayer RGB array; edge information detection means for obtaining edge information of the object from the image signals obtained by the image pickup means; joint determination means for detecting joint information of the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; and luminance data switch means for providing an output by switching between outputs of the first and second luminance data generation means based on the edge information obtained at the edge information detection means and the joint information obtained from the joint determination means.

By such construction, on the basis of the edge information and joint information, an output is provided by switching between the output of the first luminance data generation means for finding luminance data from G signals and the output of the second luminance data generation means for finding luminance data from all color signals. Hence, in joining a plurality of images, edge enhancement processing without unnaturalness at the joint portions can be performed even for an image having frequent edge portions. The above object is thereby achieved.

It is a further object of the invention to provide an image processing apparatus in which, when joining a plurality of images, edge enhancement processing can be performed smoothly and without causing unnaturalness at the joint portions even for an image having frequent edge portions.

In accordance with a tenth aspect of the invention, there is provided an image processing apparatus having a joining processing section for joining a plurality of images to generate one piece of image and a processing section for enhancing edges in an image, including: image pickup means for converting an object light into image signals of Bayer RGB array; edge information detection means for obtaining edge information of the object from the image signals obtained by the image pickup means; joint determination means for detecting joint information of the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); and means for setting the mixing ratio at the mixed luminance data generation means based on the edge information obtained at the edge information detection means and the joint information obtained from the joint determination means.

By such construction, on the basis of the edge information and joint information, mixed luminance data is generated by mixing the luminance data generated from G signal and the luminance data generated from all color signals with continuously changing the mixing ratio. Hence, in joining a plurality of images, edge enhancement processing can be performed smoothly and without unnaturalness at the joint portions even for an image having frequent edge portions. The above object is thereby achieved.

It is a further object of the invention to provide an image processing apparatus in which, when joining a plurality of images, edge enhancement processing can be performed corresponding to the characteristic of an object at favorable S/N and without unnaturalness at the joint portions.

In accordance with an eleventh aspect of the invention, there is provided an image processing apparatus having a joining processing section for joining a plurality of images to generate one piece of image and a processing section for enhancing edges in an image, including: image pickup means for converting an object light into image signals of Bayer RGB array; color information detection means for obtaining color information of the object from the image signals obtained by the image pickup means; edge information detection means for detecting edge information of the object from the image signals obtained by the image pickup means; image region determination means for determining the state of being frequent/infrequent of edge portions in the object from the image signals obtained by the image pickup means; joint determination means for detecting joint information of the image signals obtained by the image pickup means; a first luminance data generation means for finding luminance data for use in edge enhancement processing from G signals out of the image signals obtained by the image pickup means; a second luminance data generation means for finding luminance data for use in edge enhancement processing from all color signals of the image signals obtained by the image pickup means; luminance data switch means for providing an output by switching between outputs of the first and second luminance data generation means; a first selection signal generating section for generating a selection signal for controlling the switching at the luminance data switch means based on color information obtained at the color information detection means; a second selection signal generating section for generating a selection signal for controlling the switching at the luminance data switch means based on edge information obtained at the edge information detection means; and a selection signal switching section for providing an output by switching between the selection signals of the first selection signal generating section and of the second selection signal generating section based on the joint information of image from the joint determination means for joint boundary portions of image and based on a determination signal from the image region determination means for those other than the joint boundary portions of image.

By such construction, an output is provided by switching between the selection signal for controlling the switching of the luminance data switch means based on color information and the selection signal for controlling the switching of the luminance data switch means based on edge information on the basis of the joint information of image for joint boundary portions of image and on the basis of the determination signal of the image region determination means for those other than the joint boundary portions of image. Hence, in performing joining processing, the edge enhancement processing can be performed corresponding to the characteristic of the object at favorable S/N and without unnaturalness at the joint portions. The above object is thereby achieved.

It is a further object of the invention to provide an image processing apparatus in which, when joining a plurality of images, edge enhancement processing can be performed corresponding to the characteristic of an object smoothly at favorable S/N and without unnaturalness at the joint portions.

In accordance with a twelfth aspect of the invention, there is provided an image processing apparatus having a joining processing section for joining a plurality of images to generate one piece of image and a processing section for enhancing edges in an image, including: image pickup means for converting an object light into image signals of Bayer RGB array; color information detection means for obtaining color information of the object from the image signals obtained by the image pickup means; edge information detection means for detecting edge information of the object from the image signals obtained by the image pickup means; image region determination means for determining the state of being frequent/ infrequent of edge portions in the object from the image signals obtained by the image pickup means; joint determination means for detecting joint information of the image signals obtained by the image pickup means; a mixed luminance data generation means for generating mixed luminance data by mixing luminance data for use in edge enhancement processing generated from G signals out of the image signals obtained by the image pickup means and luminance data for use in edge enhancement processing generated from all color signals of the image signals with continuously changing the mixing ratio (including 1:0 and 0:1); a first mixing ratio setting means for setting the mixing ratio at the mixed luminance data generation means based on the color information obtained at the color information detection means; a second mixing ratio setting means for setting the mixing ratio at the mixed luminance data generation means based on the edge information obtained at the edge information detection means; and a mixing ratio setting signal switching section for providing an output by switching between setting signals of the first mixing ratio setting means and of the second mixing ratio setting means based on the joint information of image signals from the joint determination means for joint boundary portions of image and based on a determination signal from the image region determination means for those other than the joint boundary portions of image.

By such construction, an output is provided as switched between the setting signal of the first mixing ratio setting means for setting the mixing ratio of the mixed luminance data generation means based on color information and the setting signal of the second mixing ratio setting means for setting the mixing ratio of the mixed luminance data generation means based on edge information on the basis of the joint information of image for joint boundary portions of image and on the basis of the determination signal of the image region determination means for those other than the joint boundary portions of image. Hence, in joining a plurality of images, the edge enhancement processing can be performed corresponding to the characteristic of the object smoothly at favorable S/N and without unnaturalness at the joint portions. The above object is thereby achieved.

DESCRIPTION OF THE PREFERRED EMBODIMENTS

Figure 1:
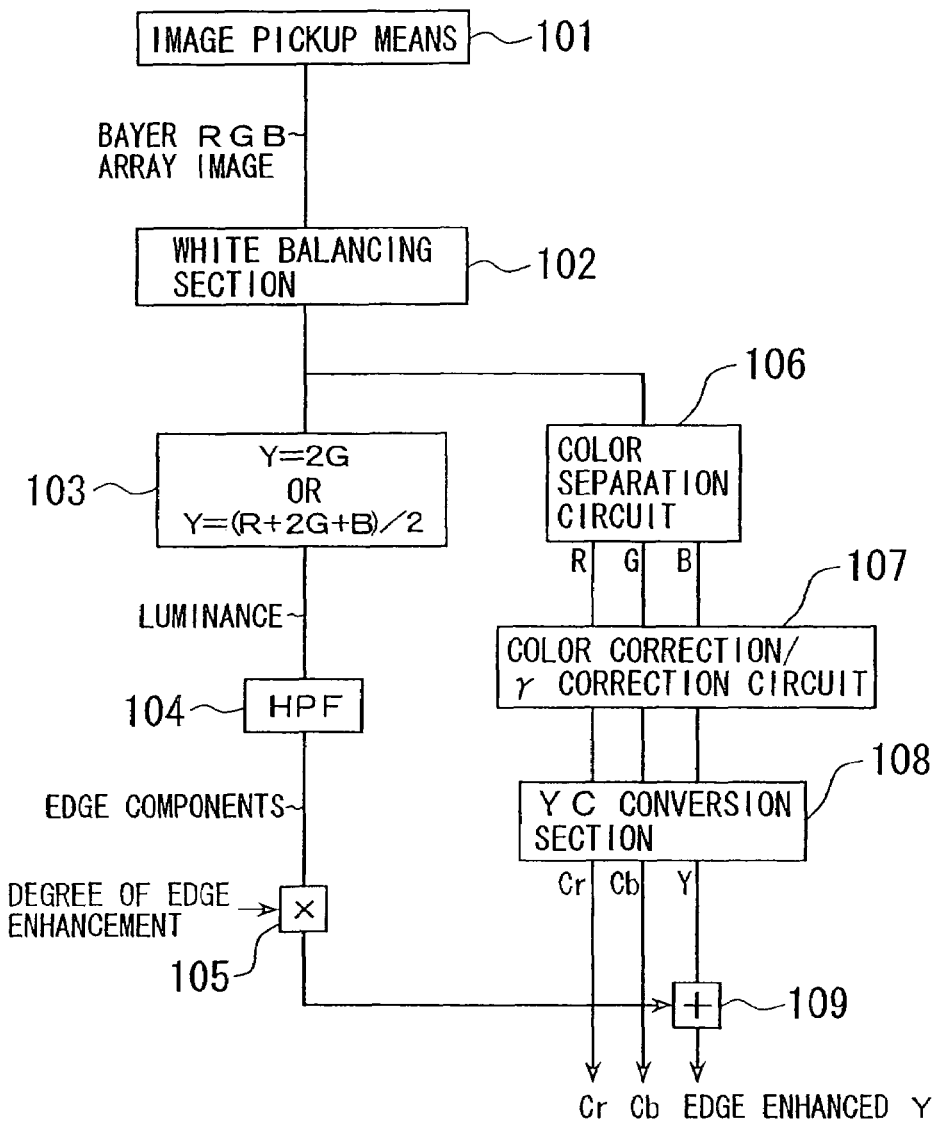
FIG. 1 is a block diagram showing an example of construction of conventional image processing apparatus for performing the edge enhancement processing.
Figure 2A:
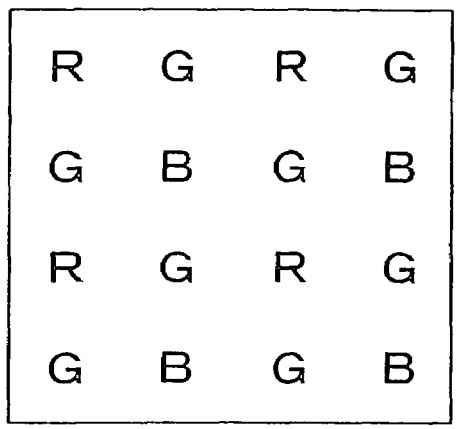
FIGS. 2A, 2B and 2C show a portion of Bayer RGB array image, the manner for generating luminance signal from four pixels of RGB and the manner for generating luminance signal from two pixels of G, respectively.
Figure 2B:
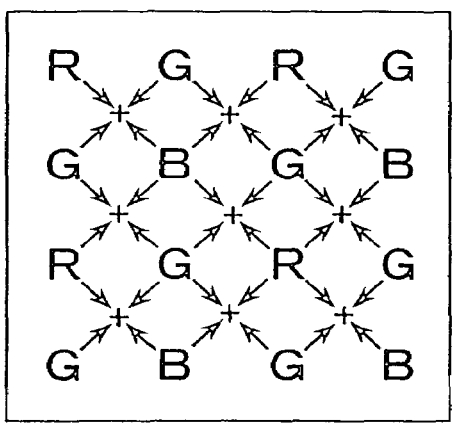
Figure 2C:
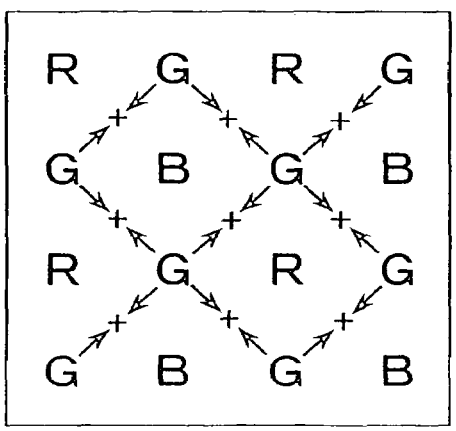
Figure 3:
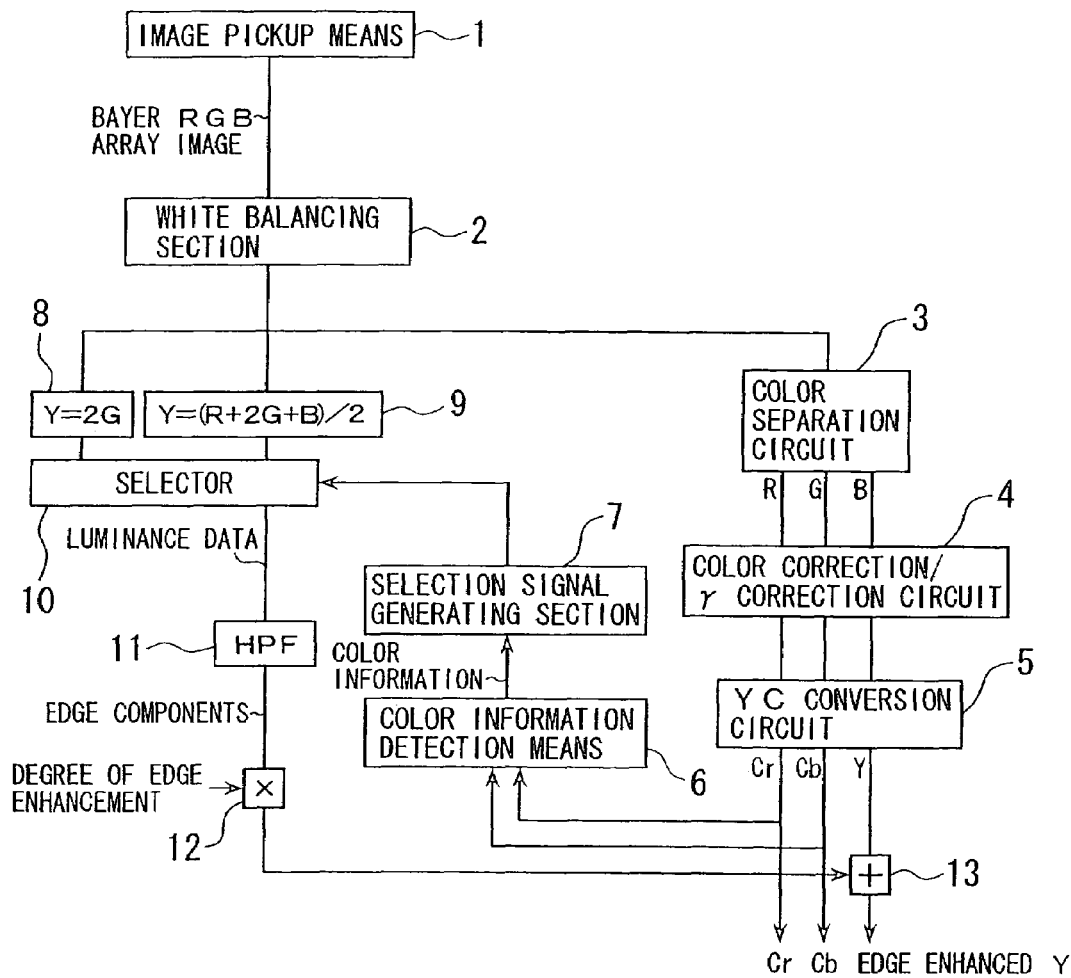
FIG. 3 is a block diagram showing a first embodiment of the image processing apparatus according to the present invention.

Some embodiments will now be described. FIG. 3 is a block diagram showing a first embodiment of the image processing apparatus according to the present invention. Included in FIG. 3 are: image pickup means 1 for outputting image signals of Bayer RGB array; a white balancing section 2; a color separation circuit 3 for separating the image signals into RGB signals by pixel as a unit; a color-correction/γ-correction circuit 4; YC conversion circuit 5; color information detection means 6 for detecting color information based on Cr, Cb color signals outputted from YC conversion circuit 5; a selection signal generating section 7 for generating a selection signal based on color information signal outputted from the color information detection means 6: a first luminance data generating section 8 for generating luminance data for use in edge enhancement based on G signals of the image signals processed of white balancing at the white balancing section 2; a second luminance data generating section 9 for generating luminance data for use in edge enhancement based on (R+2G+B)/2 of the image signals; a selector 10 for selectively outputting one or the other of the luminance data from the first luminance data generating section 8 and the luminance data from the second luminance data generating section 9 on the basis of the selection signal from the selection signal generating section 7; a high-pass filter 11 for extracting edge components from the selectively outputted luminance data; an edge enhancement magnitude adjusting section 12; and an adder circuit 13 for adding edge signals adjusted of enhancement magnitude to luminance signals Y from the YC conversion circuit 5.

A description will now be given with respect to operation of the first embodiment constructed as the above. It is the same as in a conventional example up to the point that Bayer RGB array signals obtained from image pickup means 1, after processed at white balancing section 2, are separated of colors into RGB signals at the color separation circuit 3, processed of color correction and γ correction at the color-correction/γ-correction circuit 4 and subjected to YC conversion at YC conversion circuit 5. In the first embodiment according to the invention, color information is detected at the color information detection means 6 on the basis of Cr, Cb color signals obtained from YC conversion circuit 5 and, based on such color information, a selection signal is generated at the selection signal generating section 7.

Further, Bayer RGB array image signals from the image pickup means 1 after processed of white balancing are inputted to each of the first and second luminance data generating sections 8 and 9. Luminance data based on 2G signal is generated from the first luminance data generating section 8 and luminance data based on (R+2G+B)/2 signal is generated from the second luminance data generating section 9, both being inputted to selector 10. Based on the selection signal from the selection signal generating section 7, one or the other of the luminance data corresponding to color information is then selectively outputted from the selector 10. The edge components of the selected luminance data are extracted through the high-pass filter 11 and edge signals adjusted of edge enhancement magnitude are generated at the edge enhancement magnitude adjusting section 12. The edge signals are then added to the luminance signals Y from YC conversion circuit 5 at the adder circuit 13 to perform edge enhancement processing.

A suitable luminance data for use in edge enhancement processing is thereby selected corresponding to the color information to generate edge signals. In connection with saturation, in particular, edge signals in the case of low saturation are generated by using the luminance data from the second luminance data generating section 9 and edge signals in the case of high saturation are generated by using the luminance data from the first luminance data generating section 8. An edge enhancement processing is thus performed at favorable S/N and with less edge noise in a low-saturation image or in a high-saturation image. Further, in connection with hue, edge signals are generated by using the luminance data from the second luminance data generating section in the case of specific hues such as G, magenta (Mg) and by using the first luminance data in the case of other hues. An edge enhancement processing is thereby performed corresponding to hues of the image object at favorable S/N and with less edge noise.

A detailed description will now be given with respect to detection of color information to be performed at the color information detection means 6. First, there are three types of color information to be detected from Cr, Cb signals, i.e., saturation, hue, and saturation and hue of image. Further, the techniques for detecting color information and for switching of luminance data based on the same include: a technique for detecting color information of each pixel of an object image; a technique for detecting an average color information for a whole object image; a technique for detecting an average color information of a whole frame from the color information of specific sampling portions of an object image; and techniques for switching luminance data based on these.

The fundamental technique for detection and switching of color information is to detect and switch color information for every pixel. According to this technique, a suitable edge enhancement processing at favorable S/N is possible even when pixels of chromatic color and achromatic color are mixed within an object image. On the other hand, the technique for switching by detecting an average color information for a whole object has an advantage that an edge enhancement without unnaturalness can be achieved because of the elimination of switching points, though there is a possibility that an accurate processing cannot be performed for some portions when pixels of chromatic colors and achromatic colors are mixed. Further, the technique for switching by detecting color information from specific sampling data is a modification of the above technique for switching by detecting an average color information of the whole object. It is a technique for switching by detecting an average color information of a whole frame by using data of pixels sampled at specific intervals instead of data of the whole frame and has an advantage that the size can be reduced of the operation unit and memory in the color information detection means.

Figure 4:
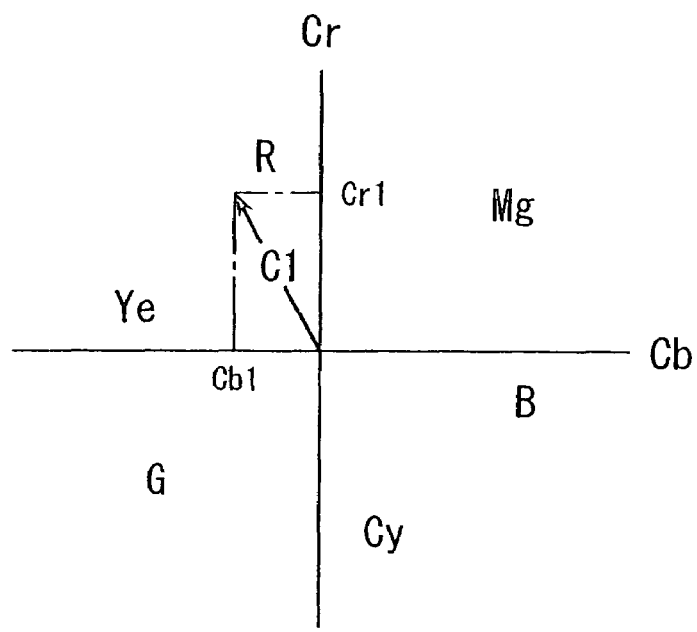
FIG. 4 shows saturation in a chromaticity diagram where Cr, Cb color signals of a primary-color filter image are the axes of coordinates.

A description will now be given with respect to actual methods of detection in the respective cases where saturation or hue or "saturation+hue" is used as the color information. First, the technique for detecting saturation from Cr, Cb color signals will be described by way of FIG. 4. FIG. 4 is a chromaticity diagram where Cr, Cb color signals are the axes of coordinates in a primary-color filter image so that saturation C1 in the case of Cr, Cb signals being Cr1, Cb1, respectively, is represented by distance from the origin on the chromaticity diagram. In particular, C1 is expressed as:

$$C1=(Cb1^2+Cr1^2)^{1/2} \qquad (1)$$

If the detected saturation C1 is a high saturation, then, a selection signal is generated from the selection signal generating section 7 so that the luminance data from the first luminance data generating section 8 is selected at selector 10. If saturation C1 is a low saturation, on the other hand, a selection signal is generated from the selection signal generating section 7 so that the luminance data from the second luminance data generating section 9 is selected at selector 10.

Figure 5:
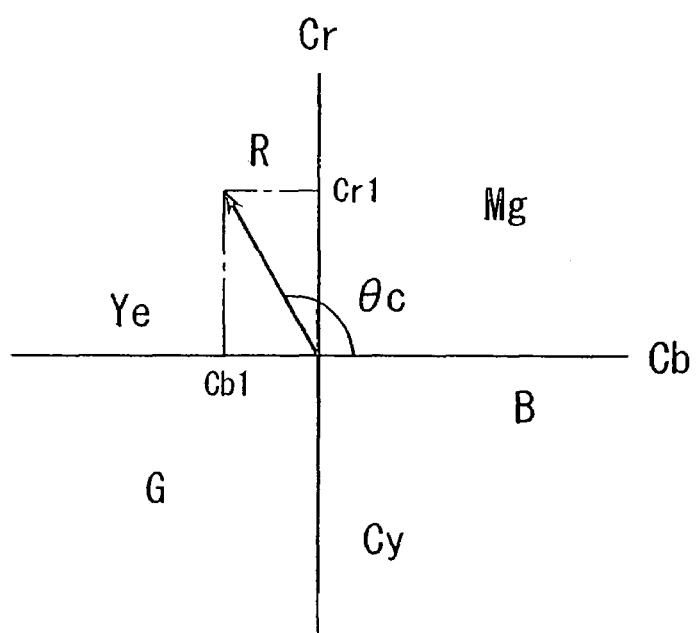
FIG. 5 shows hue in a chromaticity diagram where Cr, Cb color signals of a primary-color filter image are the axes of coordinates.

The technique for detecting hue as color information from Cr, Cb signals will now be described by way of a chromaticity diagram of FIG. 5. As shown in FIG. 5, hue θc is represented by an angle for example from the Cb axis on the chromaticity diagram. (It is supposed that phase is represented on the basis of the first quadrant of the chromaticity diagram.) In particular, hue θc is expressed as:

$$\theta c = \tan^{-1}(Cr1/Cb1) \quad (2)$$

If the detected hue θc is G or Mg, then, a selection signal is generated so that selector 10 selects the luminance data from the second luminance data generating section 9 which generates luminance data for use in the extraction of edge components based on (R+2G+B)/2 of image signals. If hue θc is one of those other than G or Mg, on the other hand, a selection signal is generated so that the selector 10 selects the luminance data from the first luminance data generating section 8 which generates luminance data for use in the extraction of edge components based on 2G of image signals.

Figure 6:
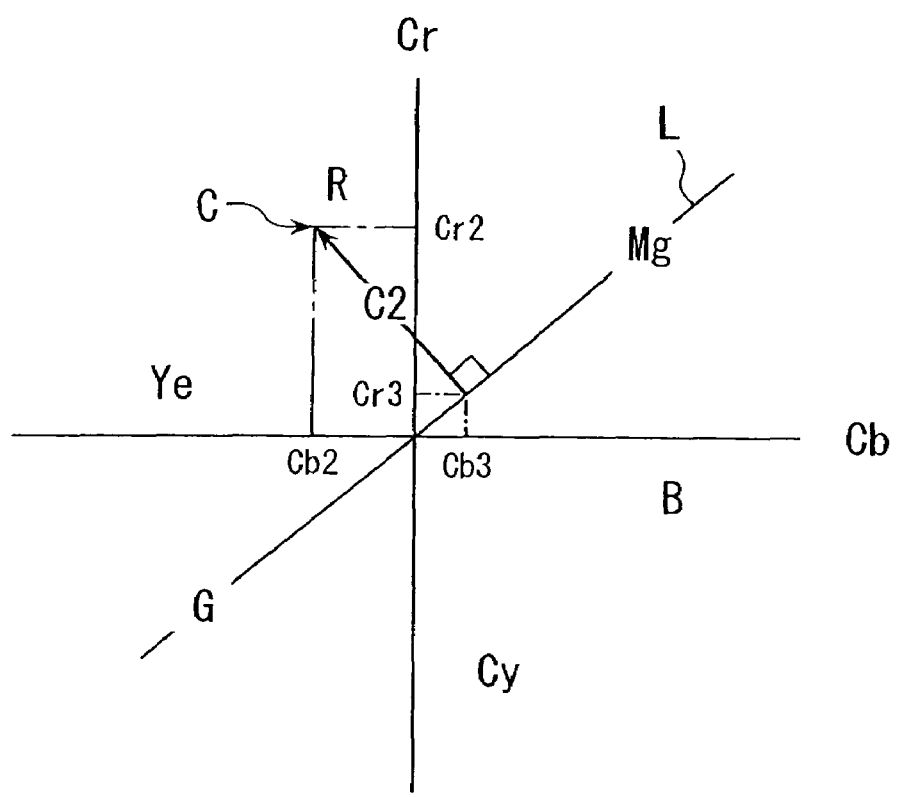
FIG. 6 shows "saturation+hue" in a chromaticity diagram where Cr, Cb color signals of a primary-color filter image are the axes of coordinates.

The technique for detecting "saturation+hue" as the color information from Cr, Cb color signals will now be described by way of a chromaticity diagram of FIG. 6. As shown in FIG. 6, "saturation+hue" C2 is found as distance from saturation C to a straight line L which connects G and Mg on the chromaticity diagram. A value is thereby obtained as also considering hue. This will be further described below. Supposing G-Mg line L as y=ax (passing through the origin), distance C2 between G-Mg line and point C (Cb2, Cr2) is found as follows. First, since a perpendicular VL to line L from C is a straight line having an inclination of −1/a and passing through point (Cb2, Cr2), it is expressed as y=−x/a+Cr2+Cb2/a. Next, an intersection (Cb3, Cr3) between line L and perpendicular VL is obtained as Cb3=(a×Cr2+Cb2)/(a²+1), Cr3=a×Cb3 by solving simultaneous equations of L and VL. Hence distance (saturation+hue) C2 between point (Cb2, Cr2) and point. (Cb3, Cr3) is expressed by the following expression (3), i.e., can be found from the values of Cb2, Cr2, and a.

$$C2 = \{(Cb2-Cb3)^2 + (Cr2-Cr3)\}^{1/2} \quad (3)$$

In this manner, if "saturation+hue" is used as the color information, a mode is achieved as considering both hue and saturation. Luminance data based on 2G is selected only in the case where it is determined to select luminance data based on 2G in each of using the color information of saturation and using that of hue. Luminance data based on (R+2G+B)/2 is selected in any other cases.

Table 2 summarizes luminance data to be selected for use in edge enhancement processing in the cases as described above respectively using saturation, hue, and "saturation+hue" as the color information to be detected.

TABLE 2

| Subject color | | Saturation only | Hue only | Saturation + hue |
|---|---|---|---|---|
| Low | G, Mg | RGB | RGB | RGB |
| Saturation | Other colors | RGB | 2G | RGB |
| High | G, Mg | 2G | RGB | RGB |
| Saturation | Other colors | 2G | 2G | 2G |

Figure 7:
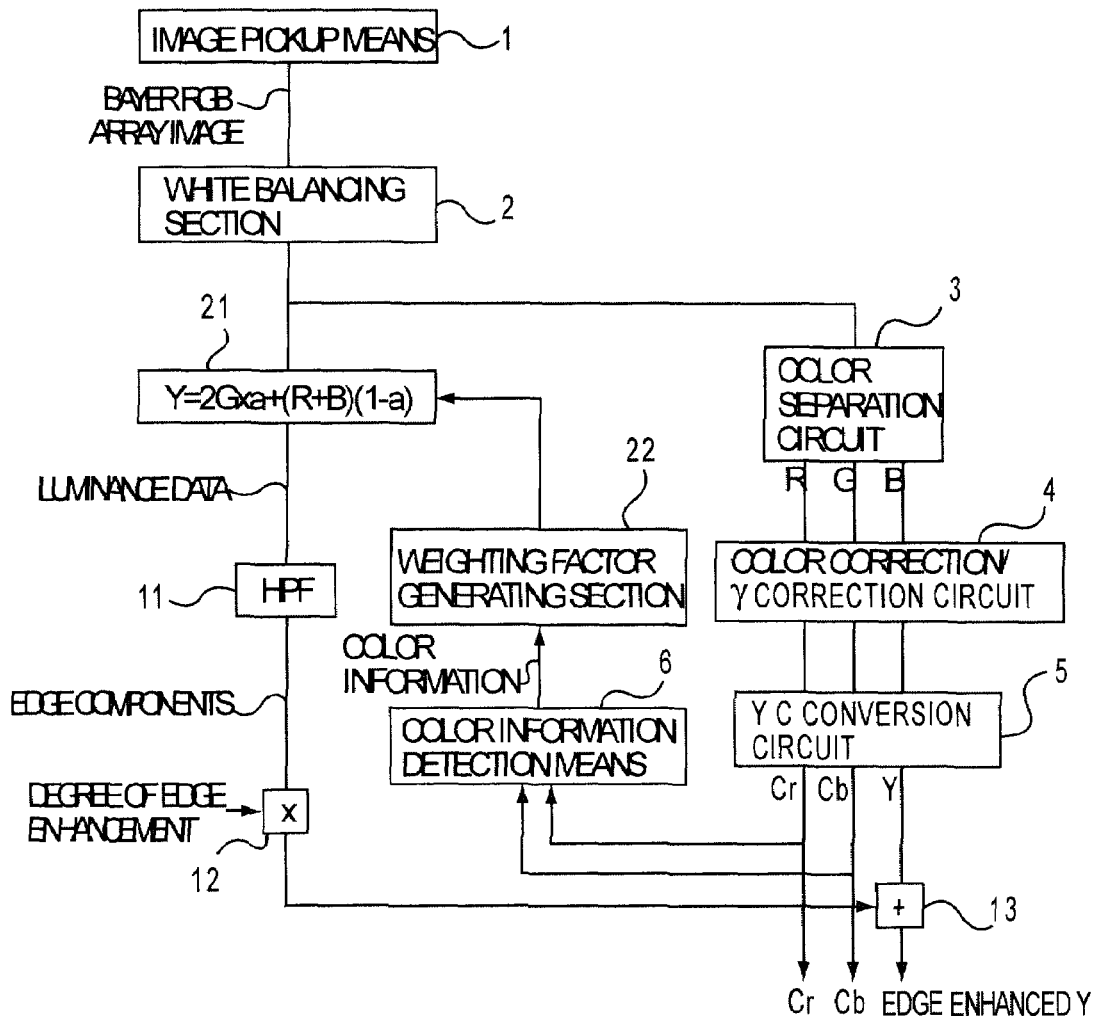
FIG. 7 is a block diagram showing a second embodiment of the invention.

A second embodiment of the invention will now be described. FIG. 7 is a block diagram showing the second embodiment where like components as in the first embodiment shown in FIG. 3 are denoted by like numerals and description thereof will be omitted. In this embodiment, provided as the luminance data generating section is a single mixed luminance data generating section 21 where luminance data based on 2G and luminance data based on (R+2G+B)/2 can be generated and at the same time it is caused to generate mixed luminance data thereof with continuously changing the mixing ratio between the two. Further, a weighting factor generating section 22 is provided as a means for setting a mixing ratio in order to control the mixing ratio at the mixed luminance data generating section 21. The weighting factor generating section 22 generates weighting factor a on the basis of color information detected by the color information detection means 6. It should be noted that this embodiment is applied only to the case where luminance data is switched for every pixel.

At the above mixed luminance data generating section 21, luminance data Y is generated in the manner of:

$$Y = 2G \times a + (R+B) \times (1-a) \quad (4)$$

where a is the weighting factor generated at the weighting factor generating section 22. If factor a is 1, luminance data based on 2G is generated. If factor a is 0.5, luminance data based on (R+2G+B)/2 is generated. For the cases of factor a being between 0.5 and 1, luminance data is generated as a mixture of the two. It is thereby possible to eliminate unnaturalness in edge enhancement at boundary portions where luminance data is switched.

Figure 8:
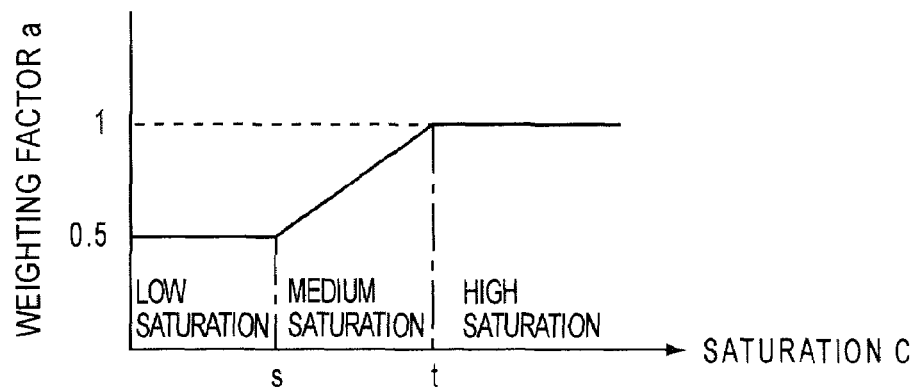
FIG. 8 shows a technique for setting a weighting factor based on saturation.

A description will now be given with respect to methods for setting weighting factor a in the intermediate transient region when the weighting factor to be generated is set on the basis of color information. First, setting of weighting factor a based on saturation information will be described by way of FIG. 8. In the technique for setting weighting factor a in the setting example shown in FIG. 8, factor a is set to 0.5 when saturation C is a saturation lower than s (low saturation threshold). Thereby Y=2G×a+(R+B)(1−a)=(R+2G+B)/2 is obtained at the mixed luminance data generating section 21 where luminance data based on this is generated. Factor a is set to 1 when saturation C is a high saturation higher than t (high saturation threshold). Y=2G×a+(R+B)(1−a)=2G is thereby obtained and luminance data based on this is generated.

When saturation C is s<C<t, i.e., if saturation of image is within a medium range, factor a becomes a=m(C −s)+0.5. Here m is an inclination and is expressed as m=0.5/(t−s). In this manner, weighting factor a is rectilinearly changed in the intermediate transient region and, based on this, the mixed luminance data is generated. In this setting example, since the weighting factor in the intermediate transient region is rectilinearly changed, operation is simple in generating the weighting factor and luminance data in the transient region.

Figure 9:
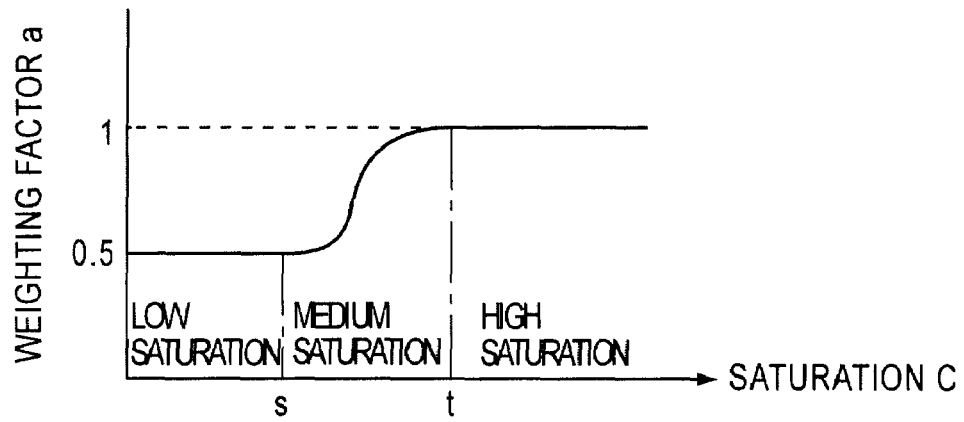
FIG. 9 shows another technique for setting a weighting factor based on saturation.

Another example of setting of weighting factor based on saturation information will now be described by way of FIG. 9. The setting technique of weighting factor a in this setting example is identical to the foregoing setting example in that: when saturation C is a low saturation lower than s, factor a is set to 0.5 and luminance data is thereby generated based on Y=2G×a+(R+B)(1−a)=(R+2G+B)/2 at the mixed luminance data generating section 21; and, when saturation C is a high saturation higher than t, factor a is set to 1 and luminance data based on Y=2G×a+(R+B)(1−a)=2G is thereby generated at the mixed luminance data generating section 21. When saturation C is s<C<t in this setting example, i.e., if saturation of image is in the medium transient region, factor a is set as having a functional relationship {a=F(C)} so that it is changed smoothly as curved from 0.5 to 1.

In this case, luminance data based on Y=2G×F(C)+(R+B){1−F(C)} is generated from the mixed luminance data generating section 21. Accordingly, since weighting factor a is smoothly changed in the intermediate saturation region between the low saturation region and the high saturation region, a smooth change is possible of the luminance data at the boundary of each region and of edge signals based on the same for use in enhancement processing.

Figure 10:
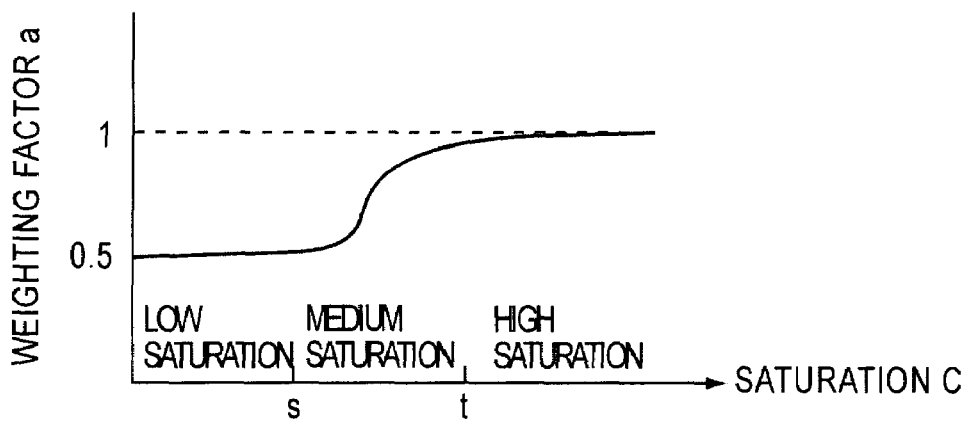
FIG. 10 shows yet another technique for setting a weighting factor based on saturation.

Yet another example of setting of weighting factor based on saturation information will now be described by way of FIG. 10. In this setting example, the weighting factor a for the lowest saturation portion of image signals is set to 0.5 and the weighting factor a for the highest saturation portion is set to 1. Weighting factor a between these is set as having a functional relationship {a=F(C)} indicating a curve smoothly connecting the low saturation region, medium saturation region and high saturation region between these irrespective of the threshold values s, t.

In this case, luminance data is generated on the basis of Y=2G×F(C)+(R+B){1−F(C)} from the mixed luminance data generating section 21. Accordingly, weighting factor a can be changed smoothly in the manner of a curve over the regions of saturation and the luminance data based on the same and edge signals for use in enhancement processing can be outputted as even more smoothly changed.

Figure 11:
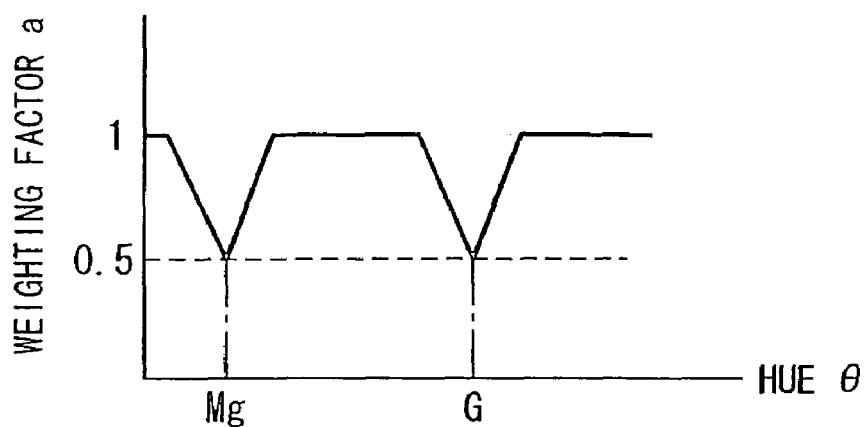
FIG. 11 shows a technique for setting a weighting factor based on hue.

The setting of an intermediate transient region of weighting factor a in the case of using hue as color information will now be described by way of FIG. 11. In the setting technique of weighting factor a in the setting example shown in FIG. 11, the weighting factor a is set to 0.5 when hue θ is of the value indicating G or Mg. Luminance data based on Y=(R+2G+B)/2 is thereby generated at the mixed luminance data generating section 21. If by contrast the weighting factor a is set to 1 when hue θ is of a value indicating one other than G and Mg, a steep change results and there is a fear that noise or the like occurs at the boundary portions. Hence the weighting factor a is set to 1 when hue θ is of a value other than those in the vicinity of G and Mg; and luminance data based on Y=2G is thereby generated. On the other hand, when hue θ is of a value indicating the vicinity of C or Mg, the weighting factor a is set so that it is changed along a straight line connecting 0.5 and 1. Luminance data is thereby generated based on what is obtained by causing the mixing ratio of (R+2G+B)/2 and 2G be changed when hue θ is in the vicinities of G and Mg and hence a steep change is avoided. In this case, since the weighting factor a in the transient region in the vicinities of G and Mg is caused to change along a straight line, arithmetic of weighting factor a or the like in the transient region can be readily performed.

Figure 12:
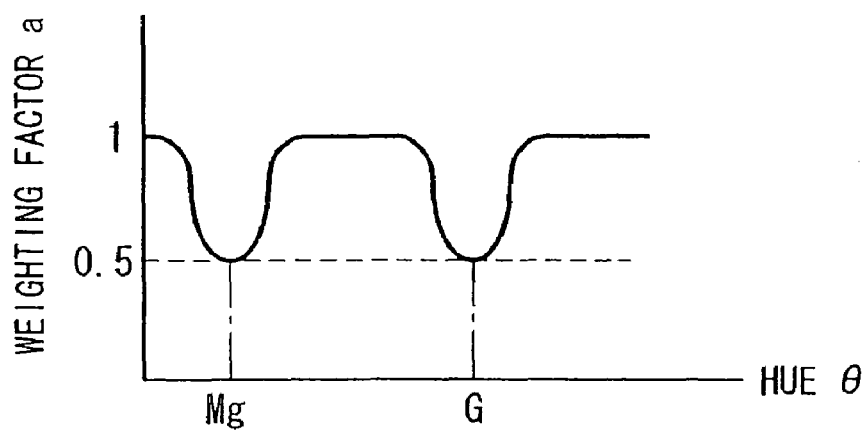
FIG. 12 shows another technique for setting a weighting factor based on hue.

Another example of setting of weighting factor based on hue information will now be described by way of FIG. 12. The setting of weighting factor a in this setting example is identical to the foregoing setting example in that: when hue θ is of a value indicating G or Mg, the weighting factor a is set to 0.5 and luminance data based on Y=(R+2G+B)/2 is thereby generated at the mixed luminance data generating section 21; and, when hue θ is of a value indicating one outside the vicinity of G or Mg, factor a is set to 1 and luminance data based on Y=2G is thereby generated at the mixed luminance data generating section 21.

In this setting example, when hue θ is in the vicinity of G or Mg, factor a is set as having a relationship changed smoothly in a curve from 0.5 to 1.

In this case, luminance data is generated from the mixed luminance data generating section 21 on the basis of what is obtained by smoothly changing the mixing ratio of Y =(R+2G+B)/2 and Y=2G. Accordingly, since the weighting factor a with hue θ being in the vicinities of G and Mg is smoothly changed, a smooth change is possible of the luminance data at such boundary regions and edge signals based on the same for use in enhancement processing.

The method shown in the above setting example is to set weighting factor a to 1 when hue θ is of a value indicating the outside the vicinity of G or Mg. However, it is also possible to set so that, when hue θ is of a value indicating one other than G or Mg, the weighting factor a is caused to be changed in a curve so that it has an arbitrary value between 0.5 and 1 for those hues other than G or Mg. While setting weighting factor as having arbitrary values for the hues other than G or Mg, a smooth change is thereby possible of luminance data as well as edge signals for use in enhancement processing as based on the hue region of G or Mg and other hue regions.

A third embodiment will now be described. FIG. 3 is a block diagram showing the third embodiment wherein the like components as in the first and second embodiments shown in FIG. 3 and FIG. 7 are denoted by like reference numerals and description thereof will be omitted. This embodiment is constructed such that a means for generating luminance data for use in edge enhancement is switched by using edge information of image instead of color information of image. In particular, an edge detection means 31 is provided to primarily detect a rough information of edges in an image, i.e., whether it is an edge portion or not, from Bayer RGB array image signals after subjected to white balancing. A selection signal is generated from a selection signal generating section 32 on the basis of such edge information from the edge detection means 31. Based on this selection signal, luminance data is selected from one or the other of the first luminance data generating section 8 and the second luminance data generating section 9. In other words, luminance data based on Y=2G from the first luminance data generating section 8 is selected when edges exist; and luminance data based on Y=(R+2G+B)/2 from the second luminance data generating section 9 is selected when edges are not detected. Edge components are then extracted in a similar manner as in the first and second embodiments from the selected luminance data to generate edge signals for use in the enhancement processing by means of addition.

By thus using image edge information for the switching of luminance data generation, the generation method of luminance data is suitably switched corresponding to the object so that an image enhanced of edges at favorable S/N can be obtained corresponding to the object. When luminance data of the first luminance data generating section 8 is selected to use luminance data generated based only on one color of G, the luminance data can then be obtained as having favorable S/N in a high saturation image.

On the other hand, when luminance data of the second luminance data generating section 9 is selected to use the luminance data generated based on all of the colors, luminance data can be obtained as having favorable S/N in a low saturation image.

Further, in finding edges from an image at the above edge detection means 31, either Y=(R+2G+B)/2 or Y=2G can be used as luminance signal. If Y=(R+2G+B)/2 is used as the luminance signal, all color edges can be detected. If Y=2G is used as the luminance signal, arithmetic at the edge detection means is easier. It should be noted that, at the above edge detection means 31, spatial frequency of the luminance signal based on (R+2G+B)/2 or 2G is detected and edge information is found from the value thereof. The spatial frequency is detected for example by investigating luminance amplitude in vertical and horizontal directions within a very small area.

Further, in switching the luminance data generating technique on the basis of edge information detected at the above edge detection means, the luminance data generating technique for a whole frame can be switched based on the detected edge information, or the luminance data generating technique for every pixel can be switched based on the detected edge information. If the luminance data generating technique for the whole frame is switched, luminance data without unnaturalness can be generated due to the fact that there is no switching point for each pixel. On the other hand, if the generating technique of luminance data is switched for every pixel within the object, luminance data having favorable S/N can be obtained even in an object where low saturation and high saturation are mixed.

Figure 13:
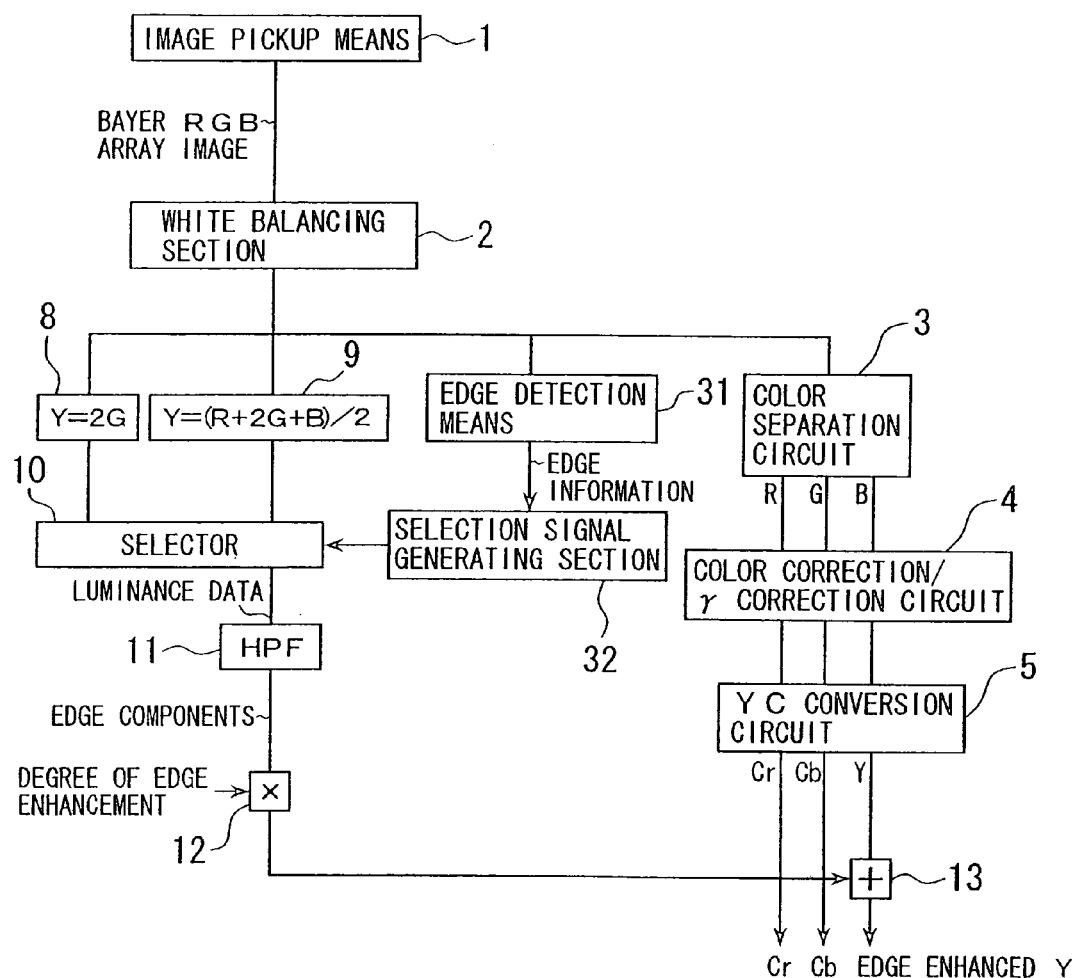
FIG. 13 is a block diagram showing a third embodiment of the invention.
Figure 14:
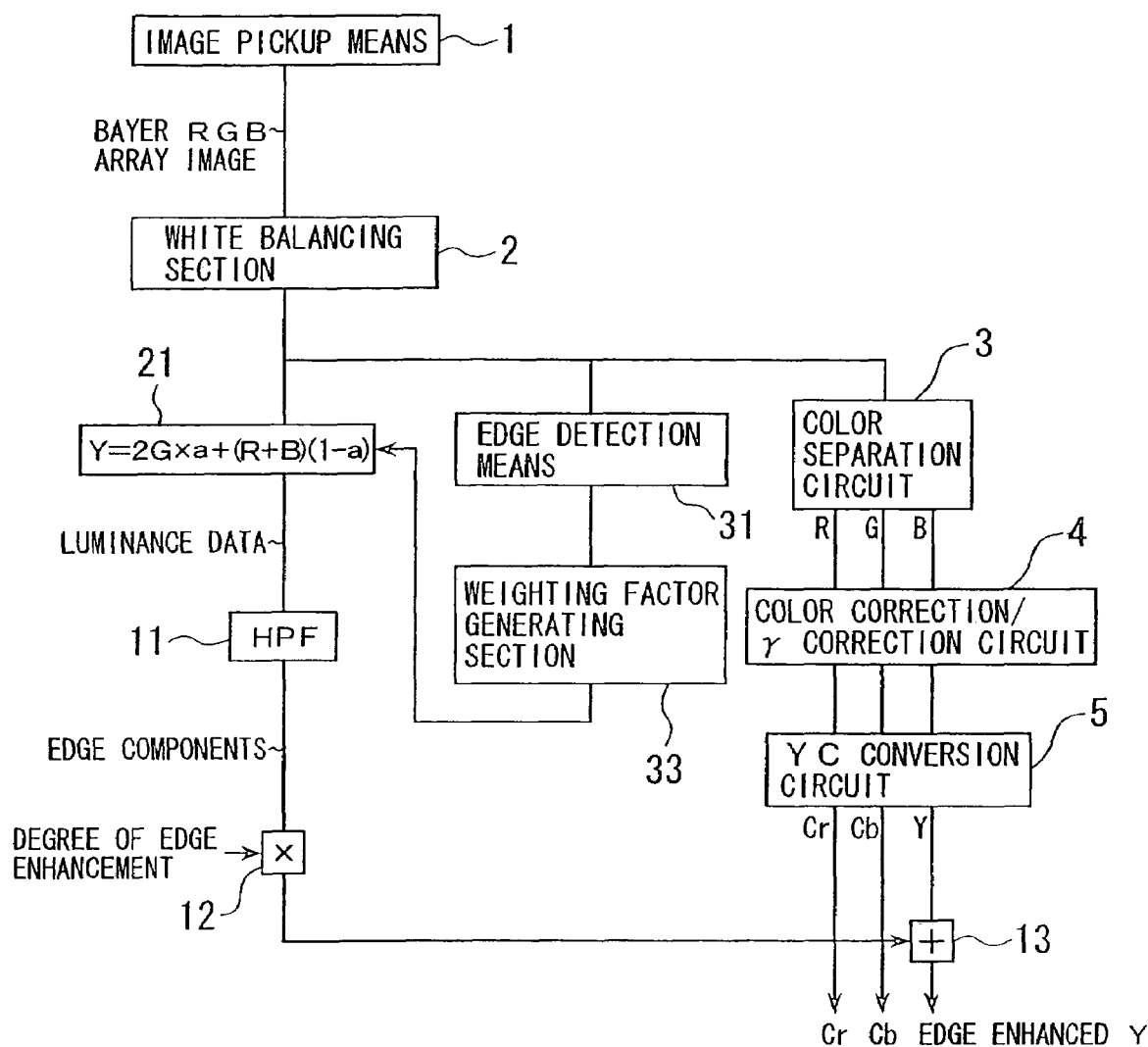
FIG. 14 is a block diagram showing a fourth embodiment of the invention.

A fourth embodiment will now be described. FIG. 14 is a block diagram showing the fourth embodiment wherein the like components as in the first to third embodiments shown in FIGS. 3, 7 and 13 are denoted by like reference numerals and description thereof will be omitted. This embodiment is achieved by applying certain portions of the second embodiment to the third embodiment. Provided as the luminance data generating section is a single mixed luminance data generating section 21 in which luminance data based 2G and luminance data based on (R+2G+B)/2 can be generated and at the same time it is possible to generate mixed luminance data thereof with continuously changing the mixing ratio between the two. Further, a weighting factor generating section 33 is provided for controlling the mixed luminance data generating section 21. The weighting factor generating section 33 generates weighting factor a on the basis of edge information detected by the edge information detection means 31. It should be noted that this embodiment is applied only to the case where the manner of generating luminance data is switched for every pixel.

At the above mixed luminance data generating section 21, luminance data Y is generated in the mode as indicated by the above expression (4). If weighting factor a is 1, luminance data based on 2G is generated. If weighting factor a is 0.5, luminance data based on (R+2G+B)/2 is generated. For the cases of weighting factor a being between 0.5 and 1, luminance data is generated with continuously changing the mixing ratio between the two. It is thereby possible to eliminate unnaturalness at boundaries where luminance data is switched.

Figure 15:
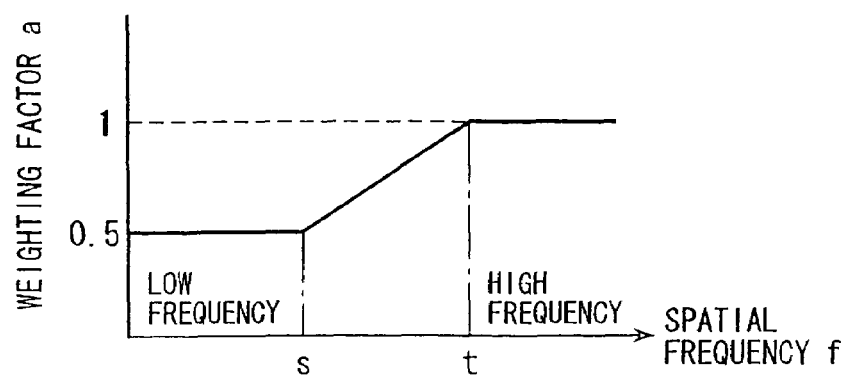
FIG. 15 shows a technique for setting a weighting factor based on edge information.

A description will now be given with respect to methods for setting weighting factor a for the intermediate transient region when the weighting factor a to be generated is set on the basis of edge information. First, a first setting method of weighting factor a based on edge information will be described by way of FIG. 15. In setting of weighting factor a in the setting example shown in FIG. 15, weighting factor a is set to 0.5 when spatial frequency f detected at the edge detection means 31 is in a low-frequency region (where edges do not exist) lower than a low-frequency threshold s. Luminance data based on (R+2G+B)/2 is thereby generated at the mixed luminance data generating section 21. The weighting factor a is set to 1 when the detected spatial frequency f is in a high-frequency region (where edges exist) higher than a high-frequency threshold t. Luminance data based on 2G is thereby generated at the mixed luminance data generating section 21.

On the other hand, if the detected spatial frequency f is s<f<t, the weighting factor a becomes a=m(f−s)+0.5. Here, m is an inclination and expressed as m=0.5/(t−s). In this manner, the weighting factor a is rectilinearly changed in the medium transient region and, based on this, mixed luminance data is generated. In this setting example, since the weighting factor in the intermediate transient region is rectilinearly changed, operation processing is simple in generating the weighting factor and luminance data in the transient region.

Figure 16:
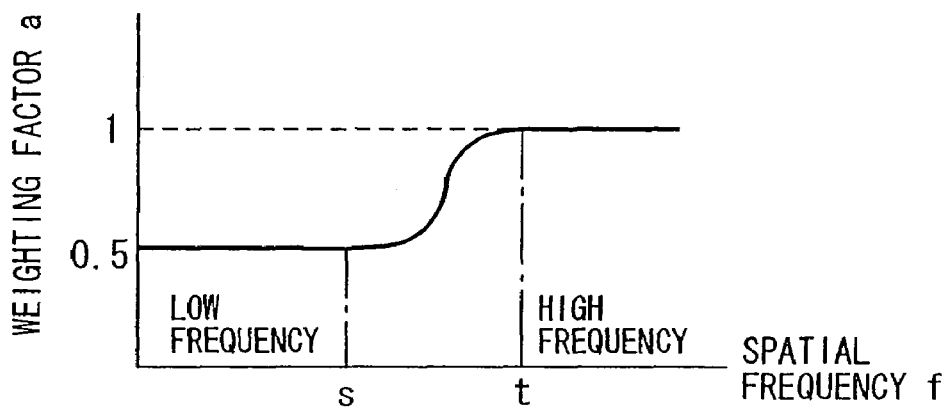
FIG. 16 shows another technique for setting a weighting factor based on edge information.

Another example of setting of weighting factor based on edge information will now be described by way of FIG. 16.

The setting of weighting factor a in this setting example is identical to the foregoing setting example in that: when the detected spatial frequency f is a low frequency lower than s, the weighting factor a is set to 0.5 and luminance data based on Y=(R+2G+B)/2 is thereby generated at the mixed luminance data generating section 21; and, when the detected spatial frequency f is a high frequency higher than t, the weighting factor a is set to 1 and luminance data based on Y=2G is thereby generated at the mixed luminance data generating section 21. When detected spatial frequency is s<f<t in this setting example, i.e., if the detected spatial frequency is of a medium level, the weighting factor a is to be set as having a functional relationship {a=F(f)} so that it is changed smoothly in a curve from 0.5 to 1.

In this case, luminance data based on Y=2G×F(f)+(R+B){1−F(f)} is generated from the mixed luminance data generating section 21. Accordingly, since weighting factor a is smoothly changed in the intermediate frequency region between the low-frequency region and the high-frequency region, a smooth change is possible of the luminance data at the boundary of each region and of edge signals based on the same for use in enhancement processing.

Figure 17:
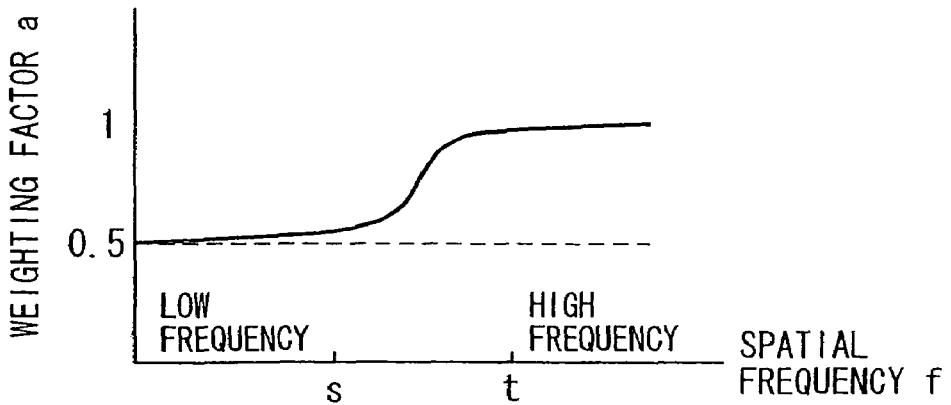
FIG. 17 shows yet another technique for setting a weighting factor based on edge information.

Yet another example of setting of weighting factor based on detected spatial frequency will now be described by way of FIG. 17. In this setting example, weighting factor a for the lowest frequency portion of the spatial frequencies detected at the edge detection means is set to 0.5 and weighting factor a for the highest frequency portion is set to 1. Weighting factor a between these is set as having a functional relationship {a=F(f)} indicating a curve smoothly connecting the low-frequency region, medium frequency region and high-frequency region between these irrespective of the threshold values s, t.

In this case, luminance data is generated on the basis of Y=2G×F(f)+(R+B){1−F(f)} from the mixed luminance data generating section 21. Accordingly, it is possible to change weighting factor a smoothly in the manner of a curve over the regions of detected spatial frequency and the luminance data based on the same and edge signals for use in enhancement processing can be outputted as even more smoothly changed.

Figure 18:
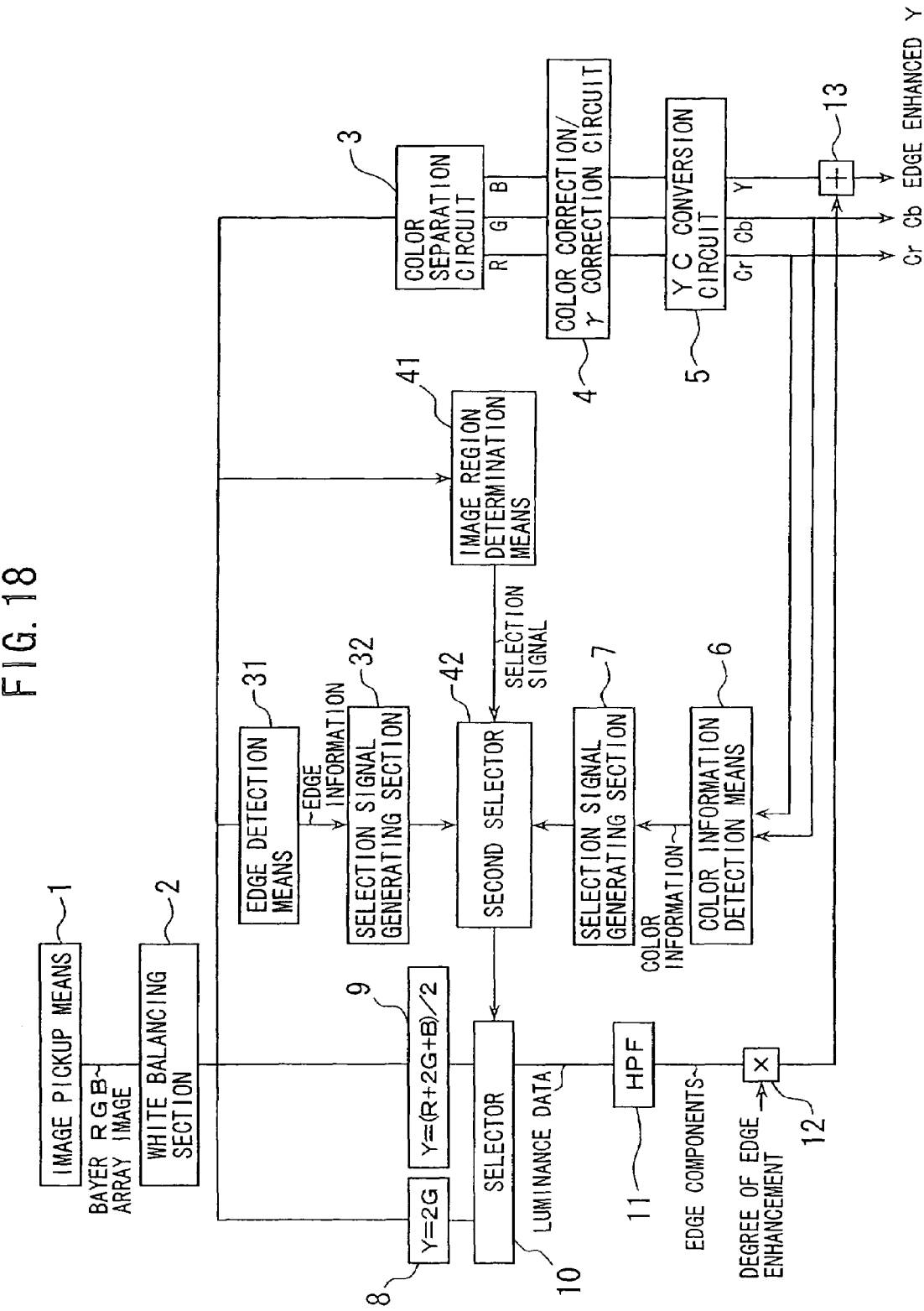
FIG. 18 is a block diagram showing a fifth embodiment of the invention.

A fifth embodiment of the invention will now be described. FIG. 18 is a block diagram showing the fifth embodiment wherein the like components as in the first to fourth embodiments are denoted by like reference numerals and description thereof will be omitted. This embodiment is achieved as a combination of the first embodiment shown in FIG. 3 and the third embodiment shown in FIG. 13. In particular, switching is made corresponding to the manner of image furthermore between the switching of luminance data generation technique based on color information and the switching of luminance data generation technique based on edge information. In other words, when the switching of luminance data generation technique based on detection of color information and the switching of luminance data generation technique based on detection of edge information are used in combination, switching must be made between these two detection results. In this embodiment, regions in an image are separated for example into those regions with frequent edges and other regions. The switching of luminance data generation technique based on detection of edge information is used for the regions with frequent edges. The switching of luminance data generation technique based on color information is used for the other regions. It is thereby possible to generate more suitable luminance data as well as edge signals for use in enhancement processing in a manner corresponding to the object.

Concrete construction of this embodiment will now be described. Referring to FIG. 18, denoted by numeral 41 is an image region determination means for making a coarse determination as to whether there are many edge portions or not within an image (the state of being frequent/infrequent of edge portions) for example for each of predetermined divided regions of Bayer RGB array image which has been subjected to white balancing. A second selector 42 provides an output in accordance with a selection signal based on the result of determination at the image region determination means 41 by selecting from the selection signal based on edge information detected at the edge detection means 31 and the selection signal based on color information detected at the color information detection means 6.

In this embodiment thus having the image region determination means 41 and selector 42, if for example it is determined as that a large number of edges exist in a certain region of the image and that edge information is predominant concerning the selection of luminance data generation technique, a selection signal based on edge information detected by the edge detection means 31 is used as the selection signal of selector 10 for selecting from the outputs of the first and second luminance data generating sections 8, 9. On the other hand, if it is determined as that the number of edges is small and color information is predominant in the image region, a selection signal based on color information detected by the color information detection means 6 is used as the selection signal of selector 10 for selecting from the outputs of the first and second luminance data generating sections 8, 9. It is thereby possible to generate more suitably and efficiently luminance data and edge signals for use in enhancement processing corresponding to the manner of each region in the image.

Figure 19:
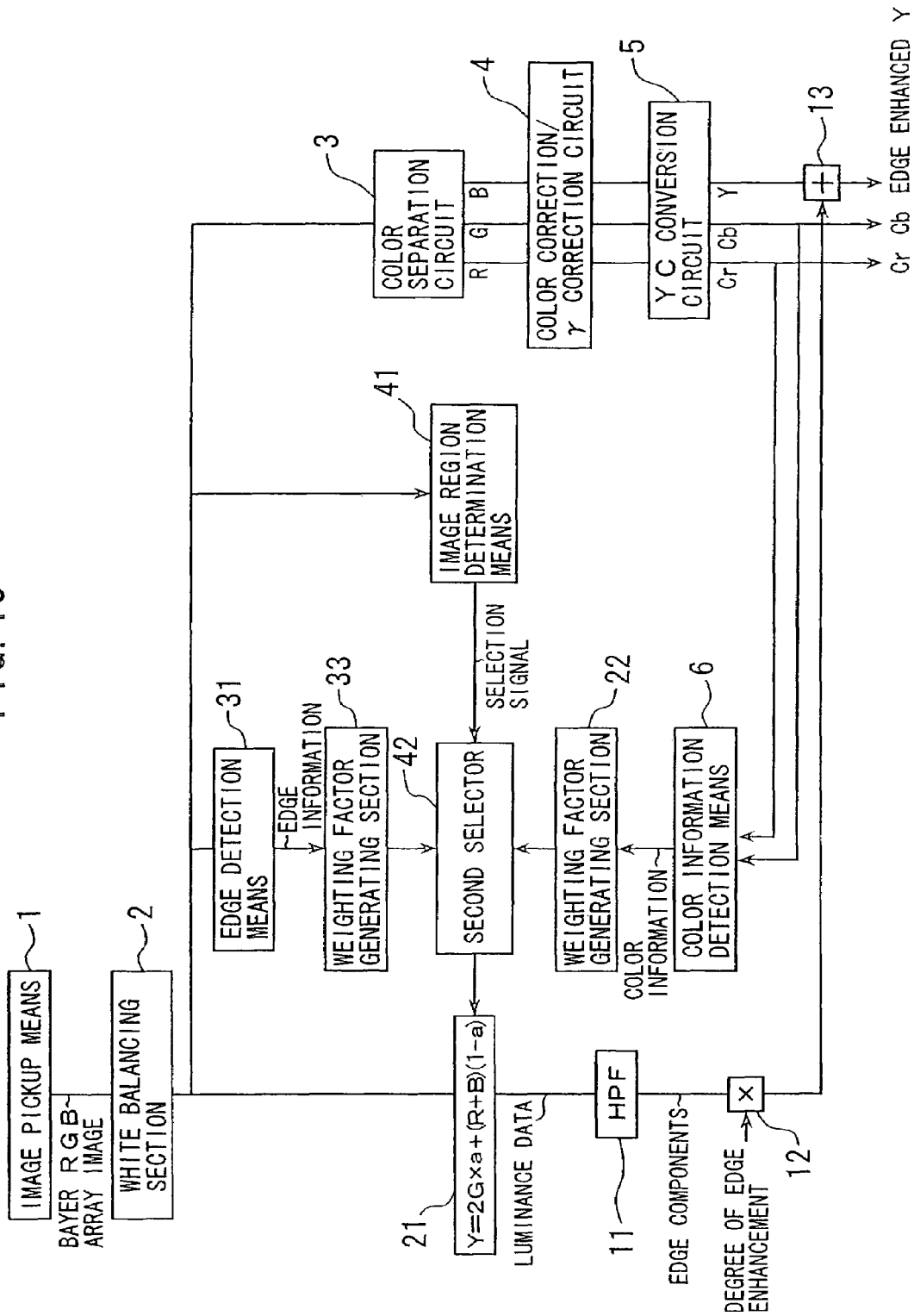
FIG. 19 is a block diagram showing a sixth embodiment of the invention.

While the above fifth embodiment is a combination of the first embodiment and third embodiment, a combination is also possible of the second embodiment and fourth embodiment which is shown in FIG. 19 as a sixth embodiment. In particular, the sixth embodiment is achieved by adding an image region determination means 41 and a second selector 42 in a similar manner as in the above fifth embodiment to a combination of one having a single mixed luminance data generating section 21 and a weighting factor generating section 22 for generating weighting factor at the mixed luminance data generating section 21 based on color information and one having a single mixed luminance data generating section 21 and a weighting factor generating section 33 for generating weighting factor at the mixed luminance data generating section 21 based on edge information so as to selectively use the weighting factor based on color information and that based on edge information. It is thereby possible to generate luminance data and edge signals for use in enhancement processing corresponding to the manner of each region in the image more suitably and efficiently and without unnaturalness at the boundaries thereof.

A seventh embodiment of the invention will now be described. In general, methods for forming a large one piece of image by joining a plurality of images are used for example in making a panoramic picture. If different edge (contour) enhancement processing techniques are used at the joint boundary portions when making a panoramic picture by means of such joining of a plurality of images, unnaturalness due to the difference in processing remains to occur at such boundary portions.

The seventh embodiment is constructed so that, when the present invention is applied to image processing apparatus for making a large one frame of image such as the above panoramic picture by joining a plurality of images, the same luminance data generating technique is used at the boundary of joining of images adjoining each other so as not to leave unnaturalness in edge enhancement processing at the joint boundary portions as described above.

Figure 20:
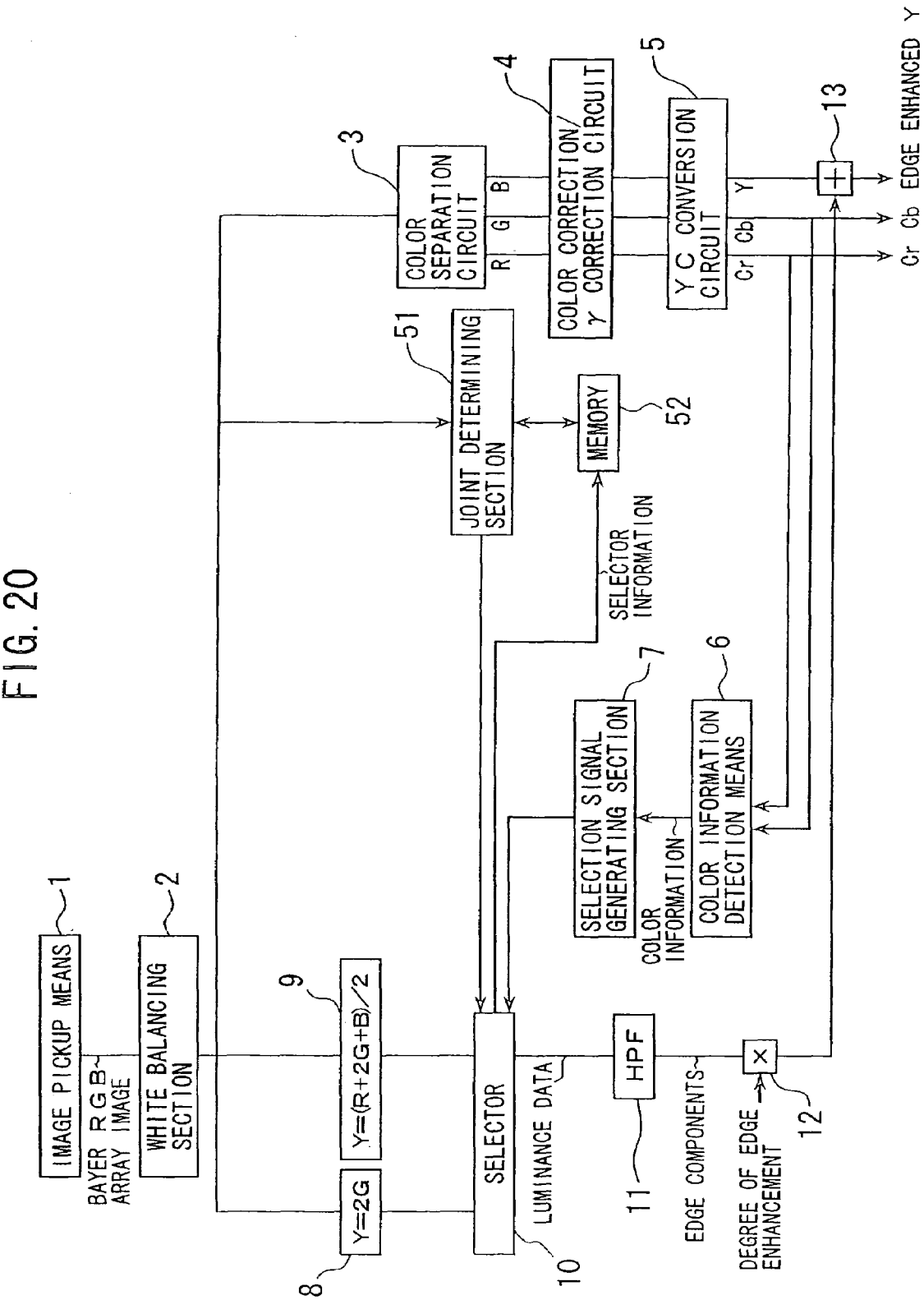
FIG. 20 is a block diagram showing a seventh embodiment of the invention.

FIG. 20 is a block diagram showing a seventh embodiment wherein the like components as in the first embodiment shown in FIG. 3 are denoted by like reference numerals and description thereof will be omitted. Additionally provided components in this embodiment are a joint determining section 51 and memory 52. The joint determining section 51 is for detecting a joint portion of two pieces of images to be joined adjoining each other. The joint portion is determined by using a technique such as one disclosed in Japanese patent application laid open Hei-7-203278, i.e., the technique in which contrast information of image is used to detect which portions of the images correspond to each other. Memory 52 is designed to store by each pixel as to which one of the luminance data generation techniques of the first and second luminance data generating sections is selected in a first piece of image to be joined.

Operation of the seventh embodiment thus constructed will now be described. First, in processing of the first piece of image, no operation is performed at the joint determining section 51; on the other hand, data is stored to memory 52 by each pixel as to which one of the luminance data of the first and second luminance data generating sections 8, 9 is selected by the selector 10. Next, in processing of a second piece of image adjoining the first piece, the joint determining section 51 detects which portions in the first and second pieces of image correspond to each other so as to determine a joint boundary portion of the second piece of image. The luminance data generation technique selected in generation processing of luminance data at the joint boundary portion of the first piece of image corresponding to the detected joint boundary portion is then read out from memory 52 and the luminance data of the joint boundary portion of the second piece of image is generated by using in a forced manner the same luminance data generation technique. Further, the luminance data other than those in the joint boundary portion of the second piece of image are generated by a luminance data generation technique based on color information. It should be noted that the switching of luminance data generation technique at the joint boundary portion and at those other than the boundary portion are performed for every pixel.

Then, at the same time of performing generation processing of luminance data of the whole area including the joint boundary portion of the second piece of image, data is stored to memory 52 as to which one of the luminance data generation techniques is selected in the luminance data generation processing of the second piece of image. Processing of a third piece and thereafter adjoining the second piece is then performed in a similar manner so as to generate a plurality of images which are enhanced of edges. The joining processing of each image is performed in a joining processing section (not shown) at a subsequent stage. It is thereby possible to obtain a joined image such as a panoramic picture enhanced of edges without unnaturalness at joint boundary portions.

It should be noted that, in the above embodiment, selector information corresponding to one piece of image must be stored to memory 52 in order to perform real-time processing of image outputted from the image pickup means. If image data is previously stored to a memory or the like, however, it suffices to store to the memory only the selector information corresponding to joint portions, since it is possible to previously determine the joint portions. Further, in this embodiment, information of saturation, hue or "saturation+hue" can be used as the color information to be detected by the color information detection means in a similar manner as in the first embodiment. Furthermore, the technique for detecting color information by each pixel signal of image signals, the technique for detecting an average color information of a whole image, the technique for detecting an average color information of one whole frame from specific sampling data of image signals, etc., can be used as the detection technique of color information at the color information detection means.

Figure 21:
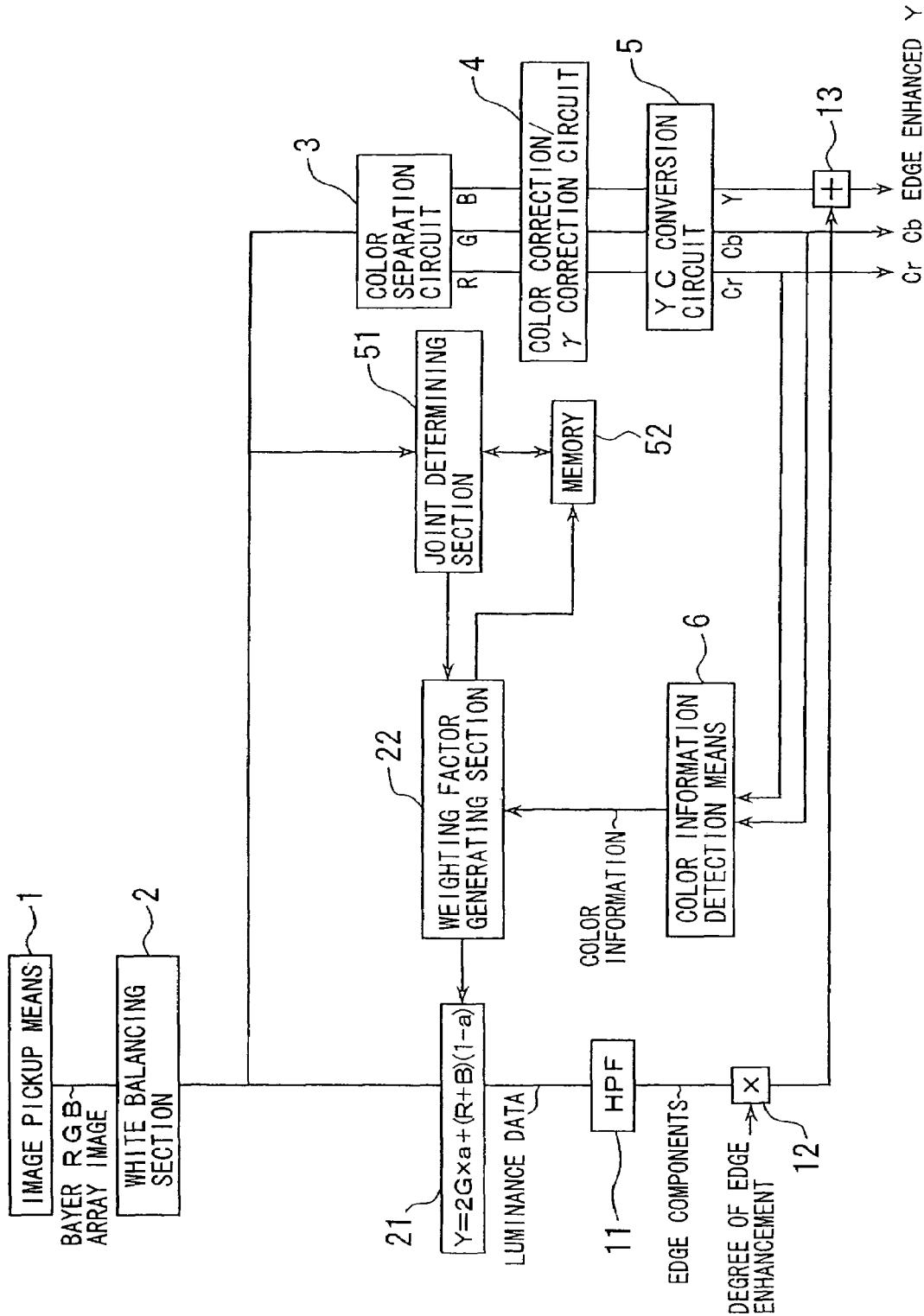
FIG. 21 is a block diagram showing an eighth embodiment of the invention.

While the above seventh embodiment has been shown as the embodiment of the case of applying the first embodiment to an image processing apparatus having a processing section for joining a plurality of images, it is also possible to apply the above second to sixth embodiments to the image processing apparatus having the joining processing section. Such application of the second embodiment is shown as an eighth embodiment in FIG. 21. When a single mixed luminance data generating section 21 and a weighting factor generating section 22 are provided as in the eighth embodiment, stored to memory 52 are weighting factors which have been set in the luminance signal generation processing of joining images. In this embodiment, the luminance data generated from G signals and the luminance signal generated from all color signals are mixed with continuously changing the mixing ratio on the basis of color information and joint information so as to generate mixed luminance data. A weighting factor is then set by each pixel based on the joint information for the joint boundary portions of image and a weighting factor is set on the basis of color information for those other than the joint boundary portions. Hence edge enhancement processing can be performed smoothly and without unnaturalness at the boundary portions in performing joining processing of a plurality of images.

Figure 22:
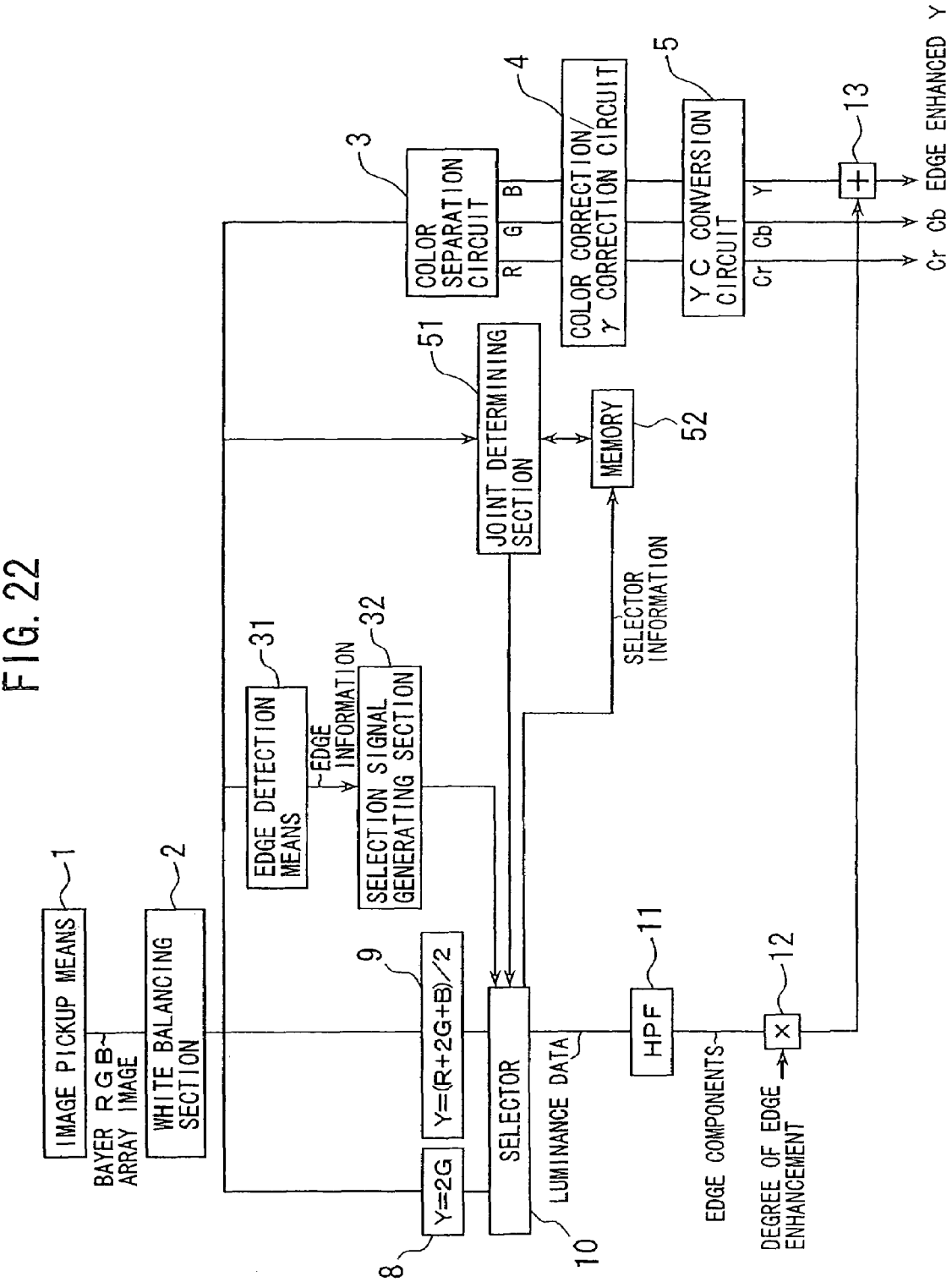
FIG. 22 is a block diagram showing a ninth embodiment of the invention.

An application of the third embodiment to an image processing apparatus having a joining processing section is shown as a ninth embodiment in FIG. 22. In this embodiment, output is switched based on edge information and joint information between the luminance data from the first luminance data generating section 8 for finding luminance data from G signals and the luminance data from the second luminance data generating section 9 for finding luminance data from all color signals. Hence edge enhancement processing can be performed without unnaturalness at the boundary portions in performing joining processing of a plurality of images even for images having frequent edges.

It should be noted that, also in this embodiment, 2G or (R+2G+B)/2 can be used as the luminance signal in finding edges from an image at the edge detection means 31 in a similar manner as in the third embodiment. Further, in switching the luminance data generation technique based on edge information and joint information, the switching is performed for every pixel based on joint information for the joint boundary portions of image and the switching is performed based on edge information for those other than the joint boundary portions of image.

Figure 23:
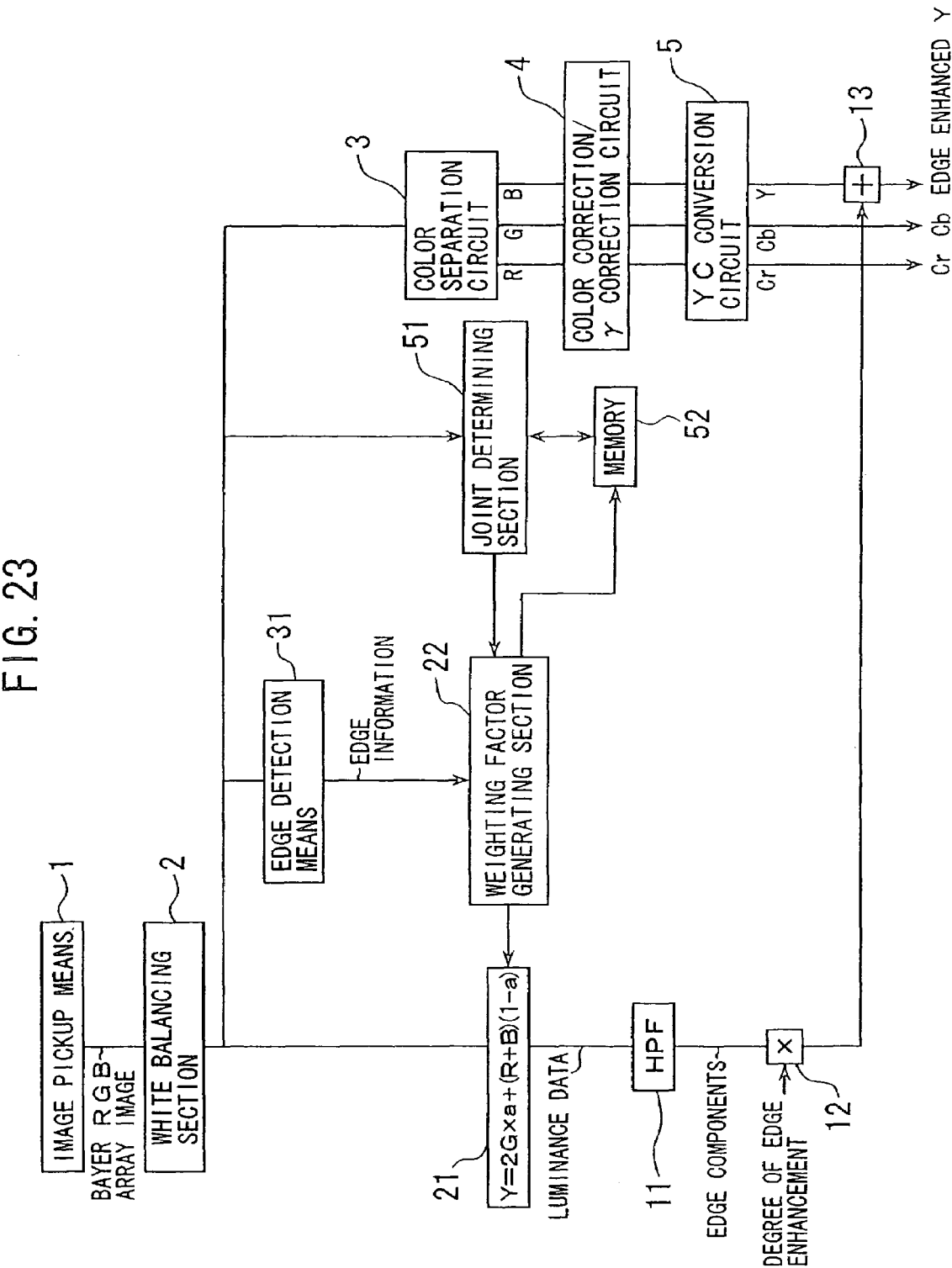
FIG. 23 is a block diagram showing a tenth embodiment of the invention.

An application of the fourth embodiment to an image processing apparatus having a joining processing section is shown as a tenth embodiment in FIG. 23. In this embodiment, mixed luminance data is generated by mixing the luminance data generated from G signals and the luminance data generated from all color signals with continuously changing the mixing ratio based on edge information and joint information. It is thereby possible in performing joining processing of a plurality of images to perform edge enhancement processing smoothly and without unnaturalness at the boundary portions thereof even for images having frequent edge portions. Further, weighting factor a at the weighting factor generating section for setting the mixing ratio is generated for every pixel on the basis of joint information of image for the joint boundary portions of image and on the basis of edge information of image for those other than the joint boundary portions of image.

Figure 24:
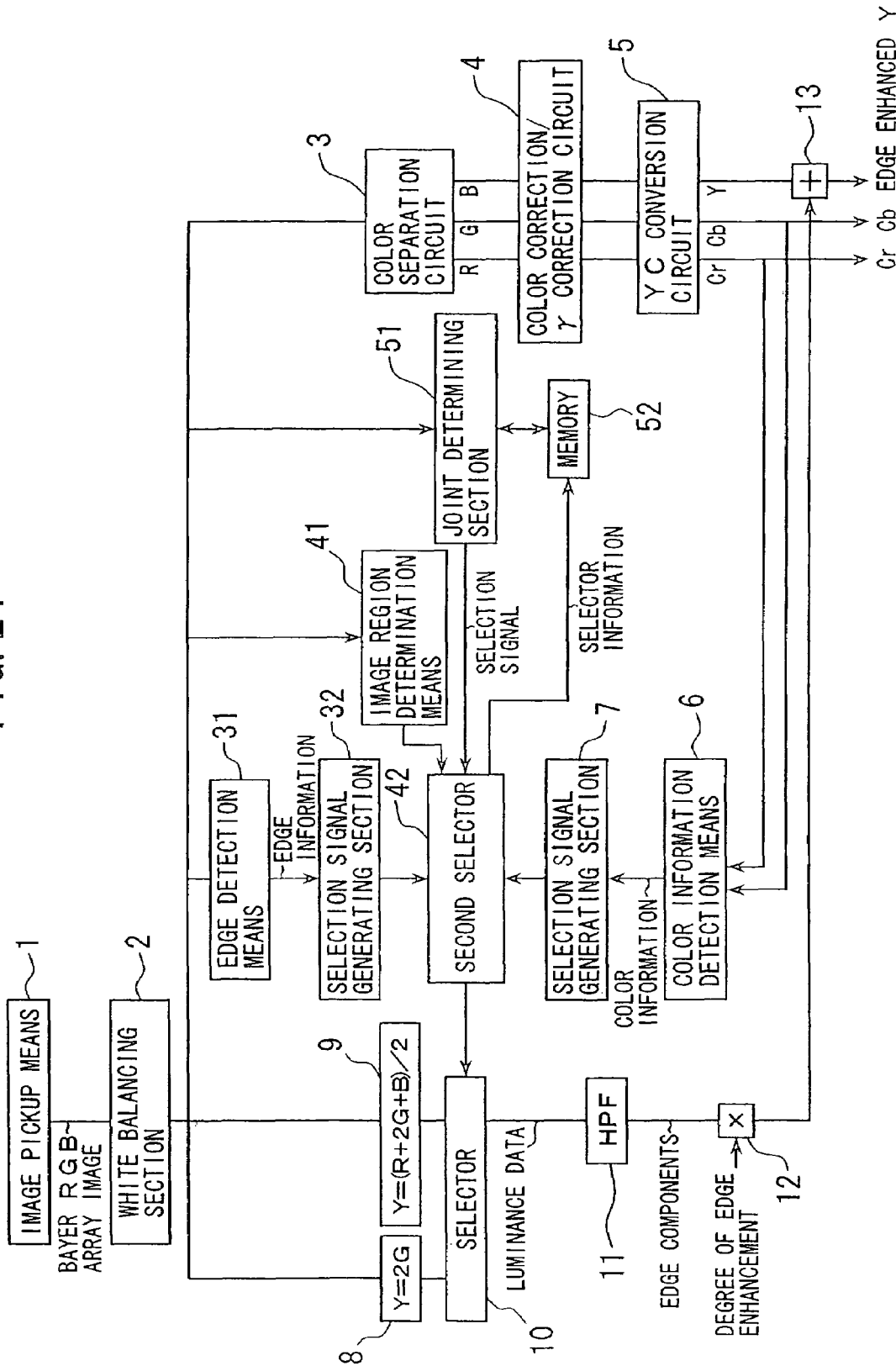
FIG. 24 is a block diagram showing an eleventh embodiment of the invention.

An application of the fifth embodiment to an image processing apparatus having a joining processing section is shown as an eleventh embodiment in FIG. 24. In this embodiment, output is provided as switched by the second selector (selector of selection signals) 42 between the selection signal for controlling the switching of selector 10 for switching luminance data based on color information and the selection signal for controlling the switching of selector 10 for switching luminance data based on edge information on the basis of joint information of image from the joint determining section 51 for the joint boundary portions of image and on the basis of determination signals of the image region determining section 41 for those other than the joint boundary portions of image. It is thereby possible in performing joining processing to perform edge enhancement processing corresponding to the characteristic of an object at favorable S/N and without unnaturalness at the joint portions.

Figure 25:
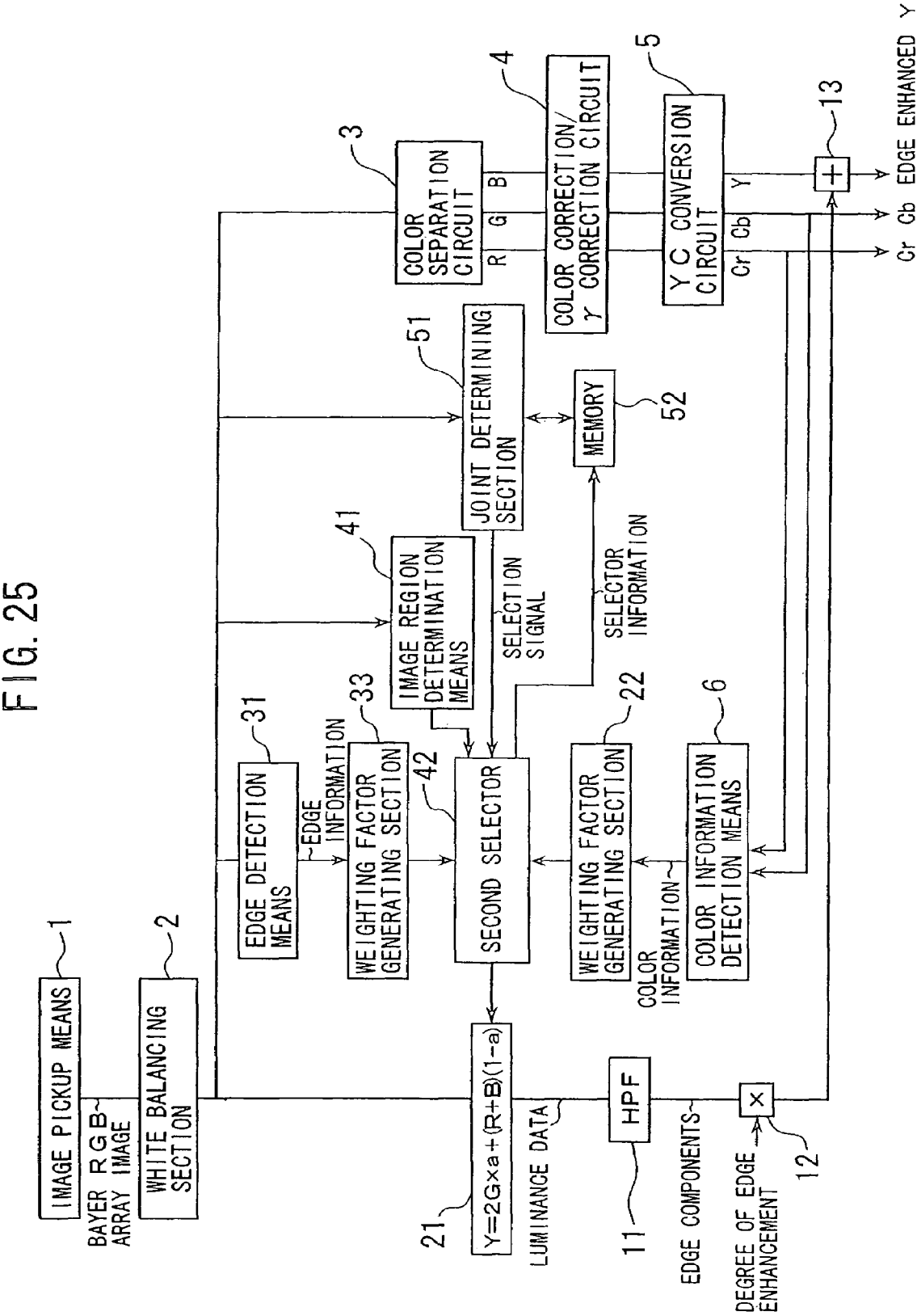
FIG. 25 is a block diagram showing a twelfth embodiment of the invention.

An application of the sixth embodiment to an image processing apparatus having a joining processing section is shown as a twelfth embodiment in FIG. 25. In this embodiment, output is provided as switched by the second selector 42 between the weighting factor a from the weighting factor generating section 22 for setting the mixing ratio at the mixed luminance data generating section 21 based on color information and the weighting factor a from the weighting factor generating section 33 for setting the mixing ratio at the mixed luminance data generating section 21 based on edge information on the basis of joint information of image from the joint determining section 51 for the joint boundary portions of image and on the basis of determination signals from the image region determining section 41 for those other than the joint boundary portions of image. It is thereby possible in performing joining processing of a plurality of images to perform edge enhancement corresponding to the characteristic of an object smoothly at favorable S/N and without unnaturalness at the joint portions.

As has been described by way of the above embodiments, it becomes possible in accordance with the first aspect of the invention to extract edge enhancing components on the basis of an optimal luminance data corresponding to color information so that an image processing apparatus can be achieved as capable of performing edge enhancement processing at favorable S/N and with less occurrence of edge noise in high-saturation regions and/or low-saturation regions. According to the second aspect of the invention, an optimal luminance data corresponding to color information can be smoothly changed so that edge enhancement processing without unnaturalness can be performed. According to the third aspect of the invention, it becomes possible to perform edge enhancement processing on the basis of an optimal luminance data corresponding to edge information even for an image having frequent edge portions. According to the fourth aspect of the invention, an optimal luminance data corresponding to edge information can be smoothly changed so that edge enhancement processing without unnaturalness can be performed even for an image having frequent edge portions. According to the fifth aspect of the invention, edge enhancement processing at favorable S/N can be performed corresponding to the characteristic of an object. According to the sixth aspect of the invention, edge enhancement processing can be performed corresponding to the characteristic of an object smoothly at favorable S/N and without unnaturalness.

According to the seventh aspect of the invention, when joining a plurality of images, edge enhancement processing can be performed without unnaturalness at the joint portions. According to the eighth aspect of the invention, when joining a plurality of images, edge enhancement processing can be performed smoothly and without unnaturalness at the joint portions. According to the ninth aspect of the invention, when joining a plurality of images, edge enhancement processing without unnaturalness at the joint portions can be performed even for an image having frequent edge portions. According to the tenth aspect of the invention, when joining a plurality of images, edge enhancement processing can be performed smoothly and without unnaturalness at the joint portions even for an image having frequent edge portions. According to the eleventh aspect of the invention, when joining a plurality of images, edge enhancement processing can be performed corresponding to the characteristic of an image at favorable S/N and without unnaturalness at the joint portions. According to the twelfth aspect of the invention, when joining a plurality of images, edge enhancement processing can be performed corresponding to the characteristic of an object smoothly at favorable S/N and without unnaturalness at the joint portions.

What is claimed is:

1. An image processing apparatus having a processing section for enhancing edges in an image, said image processing apparatus comprising:
    image pickup means for converting an object light into image signals of Bayer RGB array;
    edge information detection means for detecting edge information of an object from the image signals obtained by the image pickup means;
    a first luminance data generation means for finding luminance data for use in edge enhancement processing from G signals out of the image signals obtained by said image pickup means;
    a second luminance data generation means for finding luminance data for use in edge enhancement processing from all color signals of the image signals obtained by said image pickup means; and
    luminance data switch means for providing an output by switching between outputs of said first and second luminance data generation means based on the edge information obtained at said edge information detection means.

2. The image processing apparatus according to claim 1, wherein said edge information detection means detects edge information from luminance data based on G signals of the image signals obtained from said image pickup means.

3. The image processing apparatus according to claim 1, wherein said edge information detection means detects edge information from luminance data based on all color signals of the image signals obtained from said image pickup means.

4. The image processing apparatus according to claim 1, wherein said edge information detection means detects edge information for every pixel signal of the image signals obtained from said image pickup means so that said luminance data switch means can be switched for every pixel signal of the image signals.

5. The image processing apparatus according to claim 1, wherein said edge information detection means detects an average edge information of a whole frame of the image signals obtained from said image pickup means so that said luminance data switch means can be switched for every one frame of the image signals.

6. An image processing apparatus having a processing section for enhancing edges in an image, said image processing apparatus comprising:
    image pickup means for converting an object light into image signals of Bayer RGB array;
    edge information detection means for detecting edge information of an object from the image signals obtained by the image pickup means;
    a mixed luminance data generation means for generating mixed luminance data by mixing luminance data for use in edge enhancement processing generated from G signals out of the image signals obtained by said image pickup means and luminance data for use in edge enhancement processing generated from all color signals of the image signals with continuously changing a mixing ratio; and
    means for setting the mixing ratio at said mixed luminance data generation means based on the edge information obtained at said edge information detection means.

7. The image processing apparatus according to claim 6, wherein said edge information detection means detects edge information from luminance data based on G signals of the image signals obtained from said image pickup means.

8. The image processing apparatus according to claim 6, wherein said edge information detection means detects edge information from luminance data based on all color signals of the image signals obtained from said image pickup means.

9. The image processing apparatus according to claim 6, wherein said edge information detection means detects edge information for every pixel signal of the image signals obtained from said image pickup means and said mixing ratio setting means sets the mixing ratio for every pixel signal of the image signals.

* * * * *